(12) United States Patent
Shin et al.

(10) Patent No.: US 12,529,931 B2
(45) Date of Patent: Jan. 20, 2026

(54) DISPLAY APPARATUS WITH DIMMING BLOCK AND DRIVING DEVICE

(71) Applicant: SAMSUNG ELECTRONICS CO., LTD., Suwon-si (KR)

(72) Inventors: Seungyong Shin, Suwon-si (KR); Jungmo Kang, Suwon-si (KR); Changhoon Kim, Suwon-si (KR); Yongmin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/540,522

(22) Filed: Dec. 14, 2023

(65) Prior Publication Data

US 2024/0280858 A1    Aug. 22, 2024

Related U.S. Application Data

(63) Continuation of application No. PCT/KR2023/018380, filed on Nov. 15, 2023.

(30) Foreign Application Priority Data

Feb. 16, 2023   (KR) ........................ 10-2023-0020980

(51) Int. Cl.
G02F 1/1335      (2006.01)
G02F 1/13357     (2006.01)

(52) U.S. Cl.
CPC .. G02F 1/133612 (2021.01); G02F 1/133601 (2021.01); G02F 1/133603 (2013.01); G02F 1/133615 (2013.01)

(58) Field of Classification Search
CPC .............. G02F 1/133615; G02F 1/133603
See application file for complete search history.

(56) References Cited

U.S. PATENT DOCUMENTS 8,564,507 B2   10/2013   Jang et al.
9,311,874 B2    4/2016   Ahn et al.
(Continued)

FOREIGN PATENT DOCUMENTS

CN   20-9558928    * 10/2019  ............ F27D 21/04
CN   216435444 U    5/2022
(Continued)

OTHER PUBLICATIONS

International Search Report (PCT/ISA/210) issued by the International Searching Authority on Mar. 12, 2024 in corresponding International Application No. PCT/KR2023/018380.
(Continued)

*Primary Examiner* — Lauren Nguyen
(74) *Attorney, Agent, or Firm* — Sughrue Mion, PLLC

(57) ABSTRACT

A display apparatus includes a liquid crystal panel; and a light source apparatus. The light source apparatus includes a substrate comprising a first side directed to the liquid crystal panel; at least one dimming block disposed on the first side of the substrate and each comprising at least one light source; at least one driving device disposed on the first side of the substrate and each configured to drive the at least one dimming block; and at least one signal line disposed on the substrate. The at least one signal line includes: a timing line configured to transmit a timing signal to the at least one driving device, a data line configured to transmit a data signal to the at least one driving device, or a power line configured to transmit a power signal to the at least one driving device.

18 Claims, 17 Drawing Sheets

(56) References Cited

U.S. PATENT DOCUMENTS

| | | | |
|---|---|---|---|
| 11,217,153 | B1 | 1/2022 | Zheng et al. |
| 11,227,556 | B1* | 1/2022 | Kim .................. G02F 1/133601 |
| 11,373,605 | B1 | 6/2022 | Kim et al. |
| 2010/0039030 | A1 | 2/2010 | Winters et al. |
| 2010/0309100 | A1 | 12/2010 | Cok et al. |

FOREIGN PATENT DOCUMENTS

| | | |
|---|---|---|
| CN | 217587821 U | 10/2022 |
| EP | 2 467 875 B1 | 4/2017 |
| EP | 4009315 A1 | 6/2022 |
| KR | 10-2001-0103390 A | 11/2001 |
| KR | 10-2004-0062415 A | 7/2004 |
| KR | 10-2008-0085566 A | 9/2008 |
| KR | 10-2011-0072692 A | 6/2011 |
| KR | 10-2011-0114444 A | 10/2011 |
| KR | 10-2011-0125027 A | 11/2011 |
| KR | 10-2013-0016897 A | 2/2013 |
| KR | 10-1243144 B1 | 3/2013 |
| KR | 10-2018-0062224 A | 6/2018 |
| KR | 10-2022-0038014 A | 3/2022 |
| KR | 10-2022-0078522 A | 6/2022 |

OTHER PUBLICATIONS

Communication issued Oct. 20, 2025 by the European Patent Office in European Patent Application No. 23923047.7.

* cited by examiner

DISPLAY APPARATUS WITH DIMMING BLOCK AND DRIVING DEVICE

CROSS-REFERENCE TO RELATED APPLICATIONS

This application is a bypass continuation of International Application No. PCT/KR2023/018380, filed on Nov. 15, 2023, which is based on and claims priority to Korean Patent Application No. 10-2023-0020980, filed on Feb. 16, 2023, in the Korean Intellectual Property Office, the disclosures of which are incorporated by reference herein in their entireties.

BACKGROUND

1. Field

The disclosure relates to a display apparatus and a light source apparatus thereof.

2. Description of Related Art

In general, display apparatuses are a type of output devices for visually displaying obtained or stored image information to a user, and are used in various fields such as home or workplace.

The display apparatuses include, for example, a monitor device connected to a personal computer or a server computer, a portable computer device, a navigation terminal device, a general television device, Internet Protocol Television (IPTV), portable terminal devices such as a smartphone, tablet Personal Computer (PC), a Personal Digital Assistant (PDA) or a cellular phone, various display apparatuses used to reproduce images such as advertisements or movies in an industrial field, or various kinds of audio/video systems.

The display apparatus (self-luminous display or non-self-luminous display) includes a light source apparatus for converting electric information into visual information, and the light source apparatus includes a plurality of light sources for independently emitting light. For example, each of the plurality of light sources includes a Light Emitting Diode (LED) or an Organic LED (OLED).

A local dimming technology is applied to a light source apparatus (backlight unit) of a non-self-luminous display to improve the contrast ratio of an image. The plurality of light sources are divided into a plurality of dimming blocks, and a driving device may control a driving current supplied to the light sources included in one or more dimming blocks.

The driving devices and the light sources (e.g., light emitting diodes) may be fixed to a substrate using Surface Mount Technology (SMT).

Recently, many driving devices and light sources are used to achieve a high contrast ratio, which requires multiple wiring on the board.

SUMMARY

According to an aspect of the disclosure, signal wiring included in a display apparatus may be minimized.

According to an aspect of the disclosure, the number of layers of a printed circuit board included in a display apparatus may be minimized.

Technical aspects that can be achieved by the disclosure are not limited to the above-mentioned aspects, and other technical aspects not mentioned will be clearly understood by one of ordinary skill in the technical art to which the disclosure belongs from the following description.

Provided are a display apparatus and a light source apparatus that may have reduced signal wiring and layering.

According to an aspect of the disclosure, a display apparatus, includes: a liquid crystal panel; and a light source apparatus. The light source apparatus includes a substrate comprising a first side directed to the liquid crystal panel: at least one dimming block disposed on the first side of the substrate and each of the at least one dimming block including at least one light source; at least one driving device disposed on the first side of the substrate and each of the at least one driving device configured to drive the at least one dimming block; and at least one signal line disposed on the substrate. The at least one signal line includes: a timing line configured to transmit a timing signal to the at least one driving device, a data line configured to transmit a data signal to the at least one driving device, or a power line configured to transmit a power signal to the at least one driving device. The at least one driving device includes: at least one input pin configured to each be electrically connected to the at least one signal line, respectively; and at least one output pin configured to each be electrically connected to the at least one input pin, respectively.

The at least one driving device may include at least one internal wiring configured to electrically connect the at least one input pin and the at least one output pin within an area defined by the at least one driving device.

The at least one driving device may include a first driving device and a second driving device disposed at a first end of the first driving device, the first driving device comprises a first input pin to which the data line is electrically connected, and a first output pin configured to be electrically connected to the first input pin, and the second driving device comprises a second input pin configured to be electrically connected to the first output pin, and a second output pin.

The first input pin may be disposed at a second end of the first driving device opposite the first end of the first driving device, the first output pin may be disposed at the first end of the first driving device, the second input pin may be disposed at a second end of the second driving device, and the second output pin may be disposed at a first end of the second driving device opposite the second end of the second driving device.

The at least one driving device may include a first driving device and a second driving device disposed on a side of the first driving device, the first driving device may include a first input pin to which the timing line is electrically connected, and a first output pin configured to be electrically connected to the first input pin, and the second driving device may include a second input pin configured to be electrically connected to the first output pin, and a second output pin configured to be electrically connected to the second input pin.

The first input pin may be disposed on a first side of the first driving device, the first output pin may be disposed on a second side of the first driving device opposite the first side of the first driving device, the second input pin may be disposed on a first side of the second driving device, and the second output pin may be disposed on a second side of the second driving device opposite the first side of the second driving device.

The at least one driving device may include a first driving device and a second driving device disposed on a side of the first driving device, the first driving device may include a first input pin to which the power line is electrically connected, and a first output pin configured to be electrically connected to the first input pin, and the second driving device may include a second input pin configured to be electrically connected to the first output pin, and a second output pin configured to be electrically connected to the second input pin.

The first input pin may be configured to be disposed on a first side of the first driving device, the first output pin may be configured to be disposed on a second side of the first driving device opposite the first side of the first driving device, the second input pin may be disposed on a first side of the second driving device, and the second output pin may be disposed on a second side of the second driving device opposite the first side of the second driving device.

The at least one driving device may further include: a plurality of control pins configured to be electrically connected to the at least one dimming block, and a first input pin to which the timing line is connected and a second input pin to which the power line is connected are disposed between the plurality of control pins.

The display apparatus may include: a panel driver configured to drive the liquid crystal panel; and a dimming driver configured to drive the light source apparatus. The dimming driver may be configured to be electrically connected to the timing line and the data line.

The substrate may include a printed circuit board consisting of at least one layer comprising a first layer, and the timing line, the data line and the power line may be disposed on the first layer without intersecting each other.

The display apparatus may include: a driving line disposed on the first layer and configured to supply a driving voltage to each of the at least one dimming block; and at least one jumper connector configured to guide an electrical path to allow the driving line to be spaced apart from the power line and the data line. The driving line may not intersect the timing line.

The display apparatus may include: a control line disposed on the first layer, and configured to electrically connect the at least one dimming block and the at least one driving device. The control line may not intersect the timing line, the data line and the power line.

The display apparatus may include: a control line disposed on the substrate, and configured to electrically connect the at least one dimming block and the at least one driving device; a driving line disposed on the substrate, and configured to supply power to each of the at least one dimming block; and at least one jumper connector configured to guide an electrical path to allow the driving line to be spaced apart from the data line. The substrate may include a printed circuit board comprising at least one layer comprising a first layer, the timing line, the data line, the power line, the control line and the driving line are disposed on the first layer, the timing line, the data line, the power line, and the control line do not intersect each other, and the driving line and the data line intersect each other.

According to an aspect of the disclosure, a light source apparatus includes: a substrate: at least one dimming block disposed on a first side of the substrate and each of the at least one dimming block includes at least one light source; at least one driving device disposed on the first side of the substrate and each of the at least one driving device is configured to drive the at least one dimming block; and at least one signal line disposed on the substrate. The at least one signal line includes at least one of a timing line configured to transmit a timing signal to the at least one driving device, a data line configured to transmit a data signal to the at least one driving device, or a power line configured to transmit a power signal to the at least one driving device. The at least one driving device includes: at least one input pin configured to each be electrically connected to the at least one signal line, respectively; and at least one output pin configured to each be electrically connected to the at least one input pin, respectively.

The at least one driving device may include at least one internal wiring configured to electrically connect the at least one input pin and the at least one output pin within an area defined by the at least one driving device.

The at least one driving device may include a first driving device and a second driving device disposed at a first end of the first driving device, the first driving device may include a first input pin to which the data line is electrically connected, and a first output pin configured to be electrically connected to the first input pin, and the second driving device may include a second input pin configured to be electrically connected to the first output pin, and a second output pin configured to be electrically connected to the second input pin.

The first input pin may be disposed at a second end of the first driving device opposite the first end of the first driving device, the first output pin is disposed at the first end of the first driving device, the second input pin is disposed at a second end of the second driving device, and the second output pin is disposed at a first end of the second driving device opposite the second end of the second driving device.

The at least one driving device may include a first driving device and a second driving device disposed on a side of the first driving device, the first driving device may include a first input pin to which the timing line is electrically connected, and a first output pin configured to be electrically connected to the first input pin, and the second driving device may include a second input pin configured to be electrically connected to the first output pin, and a second output pin configured to be electrically connected to the second input pin.

The first input pin may be disposed on a first side of the first driving device, the first output pin may be disposed on a second side of the first driving device opposite the first side of the first driving device, the second input pin may be disposed on a first side of the second driving device, and the second output pin may be disposed on a second side of the second driving device opposite the first side of the second driving device.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
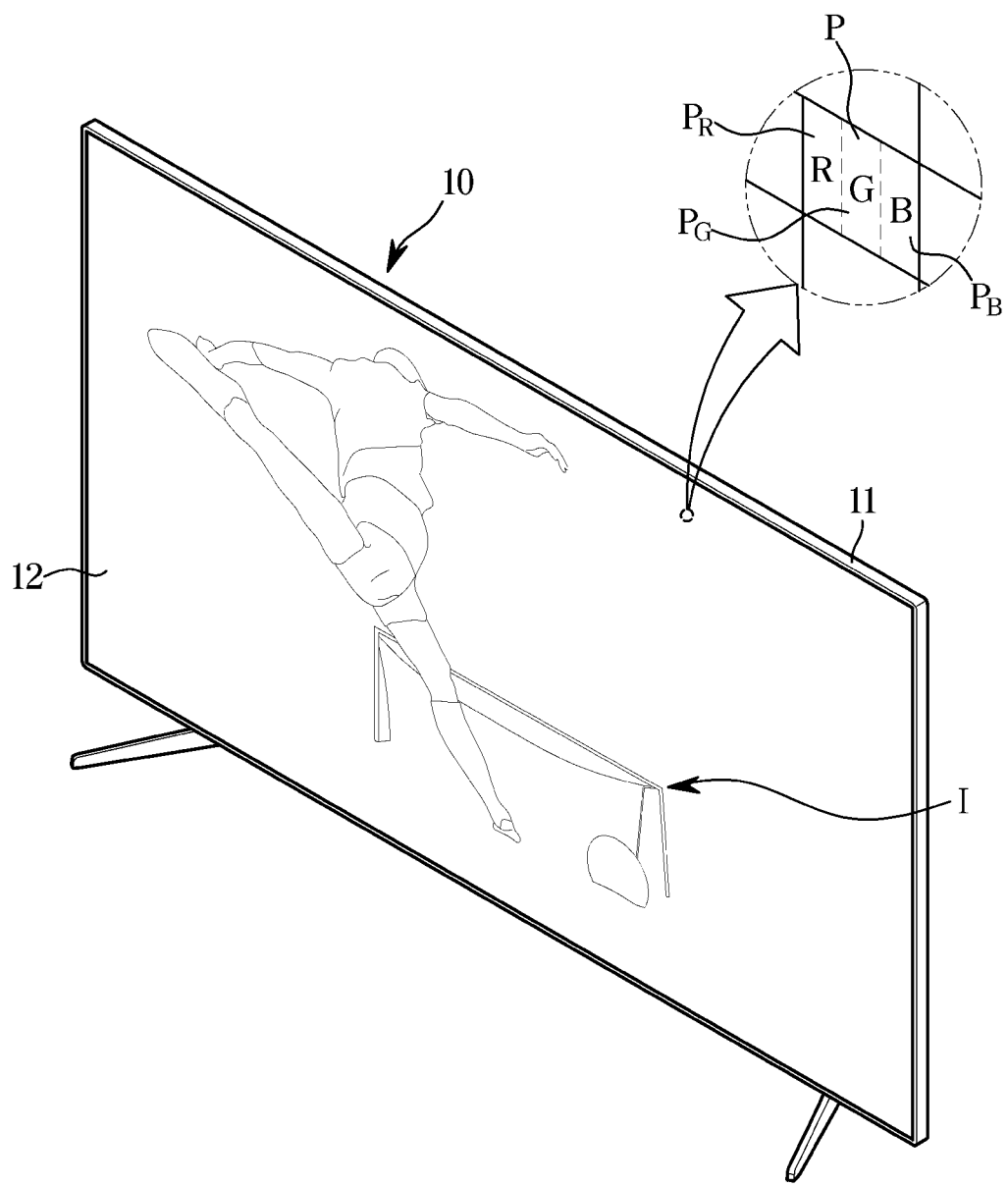
FIG. 1 is a perspective view of a display apparatus according to an embodiment.
Figure 1:
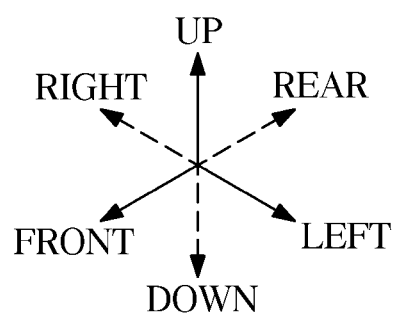

Embodiments described in the specification and configurations shown in the accompanying drawings are merely examples of the disclosure, and various modifications may replace the embodiments and the drawings of the disclosure at the time of filing of the application.

The terms used herein are only for the purpose of describing particular embodiments and are not intended to limit to the disclosure.

For example, a singular form of a noun corresponding to an item may include one item or a plurality of the items unless context clearly indicates otherwise.

Further, it should be further understood that the terms "include," and/or "have," specify the presence of stated features, integers, steps, operations, elements, components, and/or groups thereof, but do not preclude the presence or addition of one or more other features, integers, steps, operations, elements, components, and/or groups thereof.

Further, it should be understood that, although the terms "first," "second," etc. may be used herein to describe various elements, the elements are not restricted by the terms, and the terms are only used to distinguish one element from another.

Further, the terms such as "~part", "~device", "~block", "~member", "~module", and the like may refer to a unit for processing at least one function or act. For example, the terms may refer to at least one process processed by at least one hardware, such as field-programmable gate array (FPGA)/application specific integrated circuit (ASIC), software stored in memories or processors.

Hereinafter, an embodiment of the disclosure is described in detail with reference to the accompanying drawings. Like reference numerals or symbols denoted in the drawings of the specification represent members or components that perform the substantially same functions.

Hereinafter, an operation principle and embodiments of the disclosure will be described in detail with reference to the accompanying drawings.

FIG. 1 is a perspective view of a display apparatus according to an embodiment.

A display apparatus 10 is a device capable of processing an image signal received from the outside and visually displaying a processed image. Hereinafter, a case in which the display apparatus 10 is a television (TV) is an example, but is not limited thereto. For example, the display apparatus 10 may be implemented in various forms, such as a monitor, a portable multimedia device, a portable communication device, and the like, and the form of the display apparatus 10 is not limited as long as it is a device that visually displays an image.

In addition, the display apparatus 10 may be a Large Format Display (LFD) installed outdoors, such as on a roof of a building or at a bus stop. The outdoors is not necessarily limited to the outdoors, and the display apparatus 10 may be installed wherever a large number of people may enter and exit, even indoors such as at subway stations, shopping malls, movie theaters, office buildings, and stores.

The display apparatus 10 may receive content including a video signal and an audio signal from various content sources, and output video and audio corresponding to the video signal and the audio signal, respectively. For example, the display apparatus 10 may receive content data through a broadcast reception antenna or a wired cable, receive content data from a content playback apparatus, or receive content data from a content-providing server of a content provider.

As shown in FIG. 1, the display apparatus 10 may include a body 11 and a screen 12 for displaying an image I.

The body 11 forms an exterior of the display apparatus 10, and components of the display apparatus 10 for displaying the image I and performing various functions may be provided inside the body 101. It is illustrated in FIG. 1 that the body 11 has a flat plate shape, but the shape of the body 11 is not limited to that shown in FIG. 1. For example, the body 11 may have a curved plate shape.

The screen 12 is formed on a front surface of the body 11, and display the image I. For example, the screen 12 may display a still image or a video, as well as a two-dimensional (2D) plane image or a three-dimensional (3D) stereoscopic image using binocular parallax of a user.

The screen 12 may include a liquid crystal panel capable of transmitting or blocking light emitted by a light source apparatus, or the like.

A plurality of pixels P may be formed on the screen 12, and the image I displayed on the screen 12 may be formed by light emitted from each of the plurality of pixels P. For example, the image I may be formed on the screen 12 by combining light emitted from the plurality of pixels P like a mosaic.

Each of the plurality of pixels P may emit light of various brightness and various colors. In order to emit light of various colors, each of the plurality of pixels P may include sub-pixels $P_R$, $P_G$, and $P_B$.

The sub-pixels $P_R$, $P_G$, and $P_B$ may include a red sub-pixel $P_R$ capable of emitting red light, a green sub-pixel $P_G$ capable of emitting green light, and a blue sub-pixel $P_B$ capable of emitting blue light. For example, the red light may represent light having a wavelength of approximately 700 nm (nanometers, one billionth of a meter) to 800 nm, the green light may represent light having a wavelength of approximately 500 nm to 600 nm, and the blue light may represent light having a wavelength of approximately 400 nm to 500 nm.

By combining the red light of the red sub-pixel $P_R$, the green light of the green sub-pixel $P_G$, and the blue light of the blue sub-pixel $P_B$, each of the plurality of pixels P may emit light of various brightness and various colors.

Figure 2:
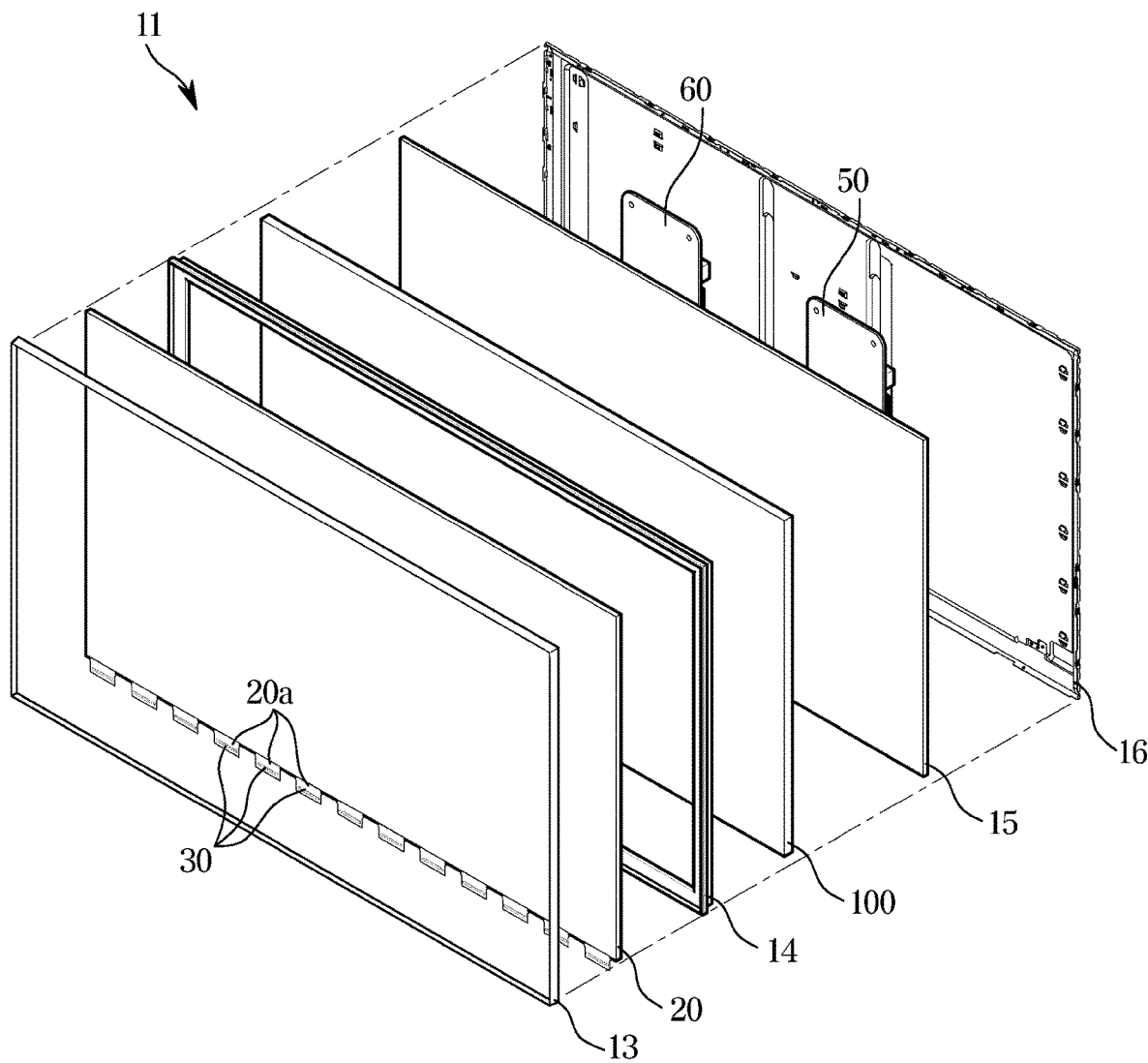
FIG. 2 is an exploded perspective view of a display apparatus according to an embodiment.
Figure 2:
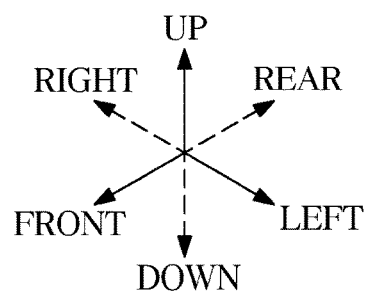
Figure 3:
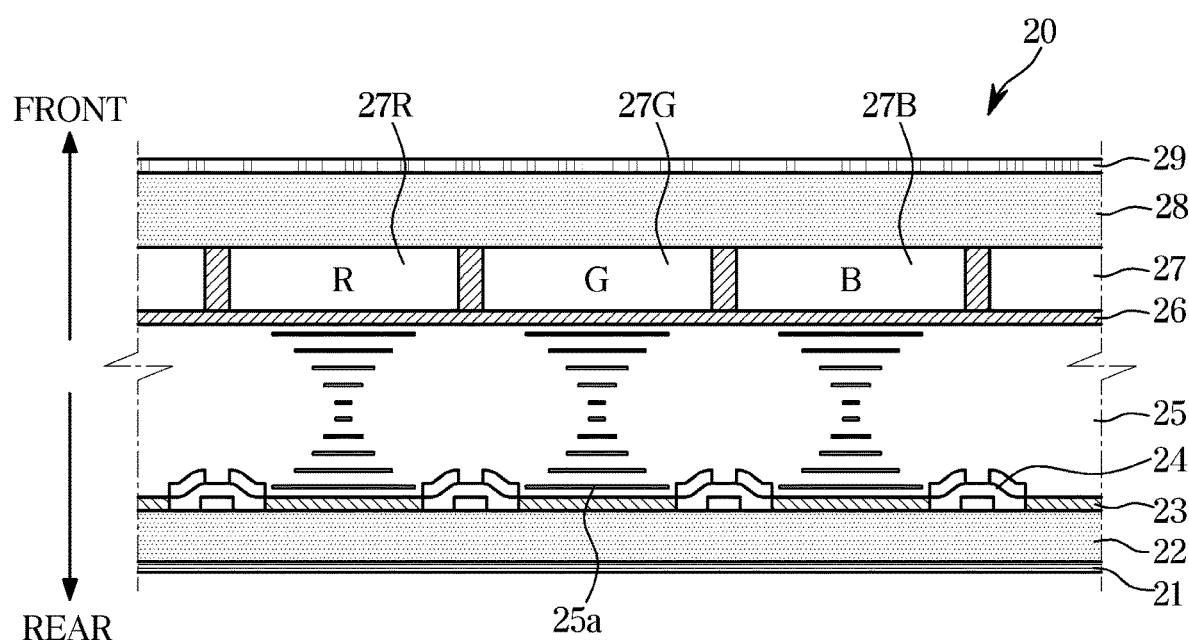
FIG. 3 is a cross-sectional view of a display panel included in a display apparatus according to an embodiment.

FIG. 2 is an exploded perspective view of a display apparatus according to an embodiment. FIG. 3 is a cross-sectional view of a display panel included in a display apparatus according to an embodiment.

As shown in FIG. 2, various components for generating an image I on the screen 12 may be provided in the body 11.

For example, the body 11 may include a light source apparatus 100 which is a surface light source, a liquid crystal panel 20 blocking or transmitting light emitted from the light source apparatus 100, a control assembly 50 controlling operations of the light source apparatus 100 and the liquid crystal panel 20, and a power supply assembly 60 supplying power to the light source apparatus 100 and the liquid crystal panel 20. In addition, the body 11 may include a bezel 13, a frame middle mold 14, a bottom chassis 15, and a rear cover 16 for supporting the liquid crystal panel 20, the light source apparatus 100, the control assembly 50, and the power supply assembly 60.

The light source apparatus 100 may include a point light source that emits white light, and may refract, reflect, and scatter the light to convert the light emitted from the point light source into a uniform surface light. As described above, the light source apparatus 100 may refract, reflect, and scatter the light emitted from the point light source to emit a uniform surface light in a forward direction.

The light source apparatus 100 will be described in more detail below.

The liquid crystal panel 20 may be provided in front of the light source apparatus 100, and may block or transmit light emitted from the light source apparatus 100 to form the image I.

A front surface of the liquid crystal panel 20 may form the screen 12 of the display apparatus 10 described above, and the liquid crystal panel 20 may form the plurality of pixels P. The plurality of pixels P of the liquid crystal panel 20 may independently block or transmit the light emitted from the light source apparatus 100. The light transmitted through the plurality of pixels P may form the image I to be displayed on the screen 12.

For example, as shown in FIG. 3, the liquid crystal panel 20 may include a first polarizing film 21, a first transparent substrate 22, a pixel electrode 23, a Thin-Film Transistor (TFT) 24, a liquid crystal layer 25, a common electrode 26, a color filter 27, a second transparent substrate 28, and a second polarizing film 29.

The first transparent substrate 22 and the second transparent substrate 28 may fixedly support the pixel electrode 23, the thin-film transistor 24, the liquid crystal layer 25, the common electrode 26, and the color filter 27. The first and second transparent substrates 22 and 28 may be formed of tempered glass or transparent resin.

The first polarizing film 21 and the second polarizing film 29 may be provided on outer sides of the first and second transparent substrates 22 and 28, respectively. The first polarizing film 21 and the second polarizing film 29 may each transmit specific polarized light and block (reflect or absorb) the other polarized light. For example, the first polarizing film 21 may transmit light polarized in a first direction and block (reflect or absorb) the other polarized light. In addition, the second polarizing film 29 may transmit light polarized in a second direction and block (reflect or absorb) the other polarized light. In this instance, the first direction and the second direction may be orthogonal to each other. Thus, the polarized light passing through the first polarizing film 21 may not directly pass through the second polarizing film 29.

The color filter 27 may be provided on an inner side of the second transparent substrate 28. The color filter 27 may include, for example, a red filter 27R transmitting red light, a green filter 27G transmitting green light, and a blue filter 27B transmitting blue light. In addition, the red filter 27R, the green filter 27G, and the blue filter 27B may be disposed parallel to each other. A region occupied by the color filter 27 may correspond to the pixel P described above. A region occupied by the red filter 27R may correspond to the red sub-pixel $P_R$, a region occupied by the green filter 27G may correspond to the green sub-pixel $P_G$, and a region occupied by the blue filter 27B may correspond to the blue sub-pixel $P_B$.

The pixel electrode 23 may be provided on an inner side of the first transparent substrate 22, and the common electrode 26 may be provided on the inner side of the second transparent substrate 28. The pixel electrode 23 and the common electrode 26 may be formed of a metal material through which electricity is conducted and may generate an electric field for changing the arrangement of liquid crystal molecules 115a constituting the liquid crystal layer 25 to be described below.

The Thin-Film Transistor (TFT) 24 may be provided on the inner side of the second transparent substrate 22. The thin-film transistor 24 may be turned on (closed) or off (opened) by image data provided from a panel driver 30. In addition, by turning the thin-film transistor 24 on (closing) or off (opening), an electric field may be formed or removed from between the pixel electrode 23 and the common electrode 26.

The liquid crystal layer 25 may be formed between the pixel electrode 23 and the common electrode 26 and may be filled with liquid crystal molecules 25a. The liquid crystal may represent an intermediate state between a solid (crystal) and a liquid. The liquid crystal may exhibit optical properties depending on a change of the electric field. For example, an arrangement direction of the molecules constituting the liquid crystal may change depending on the change of the electric field. As a result, optical properties of the liquid crystal layer 25 may change according to the presence or absence of the electric field passing through the liquid crystal layer 25. For example, the liquid crystal layer 25 may rotate a polarization direction of light about an optical axis according to the presence or absence of the electric field. Accordingly, the polarized light that has passed through the first polarizing film 21 may be changed in polarization direction while passing through the liquid crystal layer 25 and may pass through the second polarizing film 29.

A cable 20a through which image data is transmitted to the liquid crystal panel 20 and a Display Driver Integrated circuit (DDI) 30 (hereinafter, referred to as the "panel driver") that processes digital image data and outputs an analog image signal are provided on one side of the liquid crystal panel 20.

The cable 20a may electrically connect between the control assembly 50/power supply assembly 60 and the panel driver 30, and may also electrically connect between the panel driver 30 and the liquid crystal panel 20. The cable 20a may include a flexible flat cable, a film cable, or the like that may be bendable.

The panel driver 30 may receive image data and power from the control assembly 50/the power supply assembly 60 through the cable 20a. Further, the panel driver 30 may provide image data and driving current to the liquid crystal panel 20 through the cable 20a.

In addition, the cable 20a and the panel driver 30 may be integrally implemented as a film cable, a Chip On Film (COF), a Tape Carrier Package (TCP), or the like. In other words, the panel driver 30 may be disposed on the cable 20a. However, the disclosure is not limited thereto, and the panel driver 30 may be disposed on the liquid crystal panel 20.

The control assembly 50 may include a control circuit that controls operations of the liquid crystal panel 20 and the light source apparatus 100. For example, the control circuit may process a video signal and/or an audio signal received from an external content source, transmit the image data to the liquid crystal panel 20, and transmit dimming data to the light source apparatus 100.

The power supply assembly 60 may include a power supply circuit supplying power to the liquid crystal panel 20 and the light source apparatus 100. The power supply circuit may supply power to the control assembly 50, the light source apparatus 100, and the liquid crystal panel 20.

The control assembly 50 and the power supply assembly 60 may be implemented with a printed circuit board and various circuits mounted on the printed circuit board. For example, the power supply circuit may include a condenser, a coil, a resistance element, a processor, and the like and a power supply circuit board on which these elements are mounted. In addition, the control circuit may include a memory, a processor, and a control circuit board on which these elements are mounted.

Figure 4:
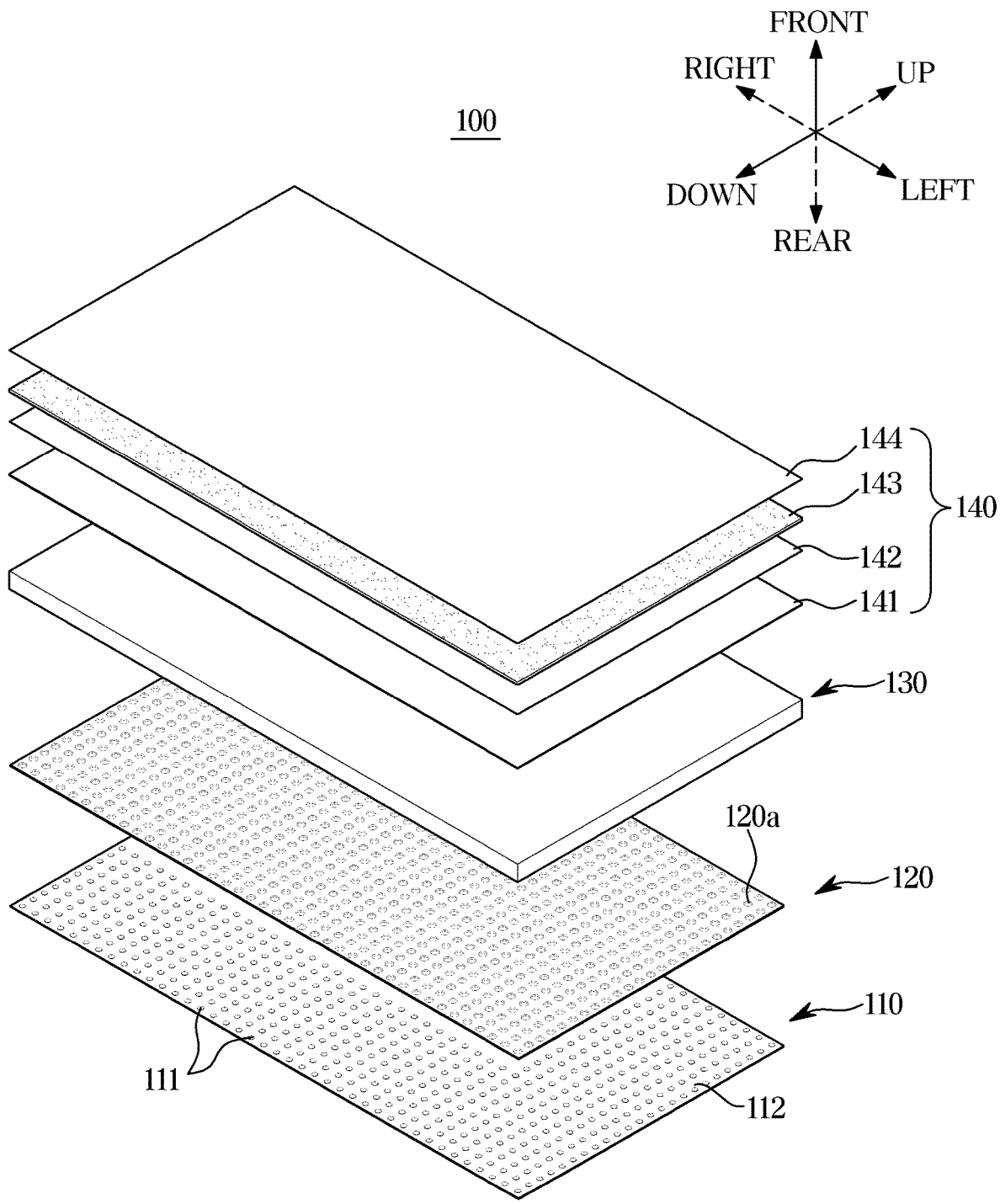
FIG. 4 is an exploded perspective view of a light source apparatus included in a display apparatus according to an embodiment.

FIG. 4 illustrates an example of the light source apparatus 100 included in a display apparatus according to an embodiment.

As shown in FIG. 4, the light source apparatus 100 may include a light source module 110 generating light, a reflector sheet 120 reflecting light, a diffuser plate 130 uniformly diffusing light, and an optical sheet 140 improving luminance of the output light.

The light source module 110 may include a plurality of light sources 111 emitting light, and a substrate 112 fixedly supporting the plurality of light sources 111.

The plurality of light sources 111 may be arranged in a predetermined pattern to allow light to be emitted with uniform luminance. The plurality of light sources 111 may be arranged to allow a distance between a single light source and each light source adjacent thereto to be the same.

For example, as shown in FIG. 4, the plurality of light sources 111 may be aligned in rows and columns. For example, the plurality of light sources may be arranged to form an approximate square by four adjacent light sources. In addition, any one light source is disposed adjacent to four light sources, and a distance between the single light source and each of the four light sources adjacent thereto may be substantially the same.

Furthermore, according to embodiments, the plurality of light sources 111 may be arranged to allow an approximately equilateral triangle to be formed by three adjacent light sources. In this instance, a single light source may be disposed adjacent to six light sources, and a distance between the single light source and each of the six adjacent light sources may be approximately the same.

However, the arrangement of the plurality of light sources 111 is not limited to that described above, and the plurality of light sources 111 may be arranged in various patterns to allow light to be emitted with uniform luminance.

The light source 111 may employ an element capable of emitting monochromatic light (light having a specific range of wavelengths, for example, blue light) or white light (for example, mixed light of red light, green light, and blue light) in various directions by receiving power. For example, the light source 111 may include a Light Emitting Diode (LED). The LED may be implemented in a variety of sizes and may include, for example, Mini LEDs and/or Micro LEDs.

The substrate 112 may fix the plurality of light sources 111 to prevent positions of the light sources 111 from being changed. In addition, the substrate 112 may supply each light source 111 with power for the light source 111 to emit light.

The substrate 112 may fix the plurality of light sources 111. The substrate 112 may include a synthetic resin and/or tempered glass and/or a Printed Circuit Board (PCB) on which a conductive power feed line for supplying power to the light source 111 is formed.

According to various embodiments, the substrate 112 may include a multi-layer PCB including a plurality of layers.

According to various embodiments, the substrate 112 may be a single-sided PCB including a single layer.

Various types of signal lines (wiring) for controlling the light source 111 may be formed on the substrate 112.

The reflector sheet 120 may allow light emitted from the plurality of light sources 111 to be reflected forward or in a direction close to the forward direction.

A plurality of through holes 120a corresponding respectively to the plurality of light sources 111 of the light source module 110 may be formed in the reflector sheet 120. The light sources 111 of the light source module 110 may pass through the through holes 120a and protrude forward of the reflector sheet 120.

For example, in an assembly process of the reflector sheet 120 and the light source module 110, the plurality of light sources 111 of the light source module 110 are inserted into the plurality of through holes 120a formed in the reflector sheet 120. As a result, the substrate 112 of the light source module 110 may be located on the rear of the reflector sheet 120, but the plurality of light sources 111 of the light source module 110 may be located on the front of the reflector sheet 120.

Accordingly, the plurality of light sources 111 may emit light in front of the reflector sheet 120.

The plurality of light sources 111 may emit light in front of the reflector sheet 120 in various directions. Light may be emitted from the light source 111 not only toward the diffuser plate 130, but also toward the reflector sheet 120, and the reflector sheet 120 may reflect the light emitted toward the reflector sheet 120 toward the diffuser plate 130.

The light emitted from the light source 111 may pass various objects such as the diffuser plate 130, the optical sheet 140, and the like. When the light passes the diffuser plate 130 and the optical sheet 140, a portion of the incident light is reflected from surfaces of the diffuser plate 130 and the optical sheet 140. The reflector sheet 120 may reflect the light reflected by the diffuser plate 130 and the optical sheet 140.

The diffuser plate 130 may be disposed in front of the light source module 110 and the reflector sheet 120 to uniformly disperse the light emitted from the light source 111 of the light source module 110.

As described above, the plurality of light sources 111 may be located everywhere on a rear surface of the light source apparatus 100. The plurality of light sources 111 are equidistantly arranged on the rear surface of the light source apparatus 100, but differences in luminance may exist depending on the positions of the plurality of light sources 111.

To eliminate the difference in luminance due to the plurality of light sources 111, the diffuser plate 130 may diffuse the light emitted from the plurality of light sources 111 within the diffuser plate 130. In other words, the diffuser plate 130 may uniformly emit non-uniform light forward from the plurality of light sources 111.

The optical sheet 140 may include various sheets for improving luminance or luminance uniformity. For example, the optical sheet 140 may include a diffuser sheet 141, a first prism sheet 142, a second prism sheet 143, a reflective polarizing sheet 144, and the like.

The diffuser sheet 141 diffuses light for uniformity of luminance. The light emitted from the light source 111 may be diffused by the diffuser plate 130 and then diffused again by the diffuser sheet 141 included in the optical sheet 140.

The first and second prism sheets 142 and 143 may concentrate the light diffused by the diffuser sheet 141, thereby increasing the luminance. The first and second prism sheets 142 and 143 may have triangular prism patterns arranged adjacent to each other to form a plurality of bands.

The reflective polarizing sheet 144 may be a kind of polarizing film, and may transmit a portion of the incident light, and reflect other portions to improve luminance. For example, the reflective polarizing sheet 144 may transmit light polarized in the same direction as a predetermined polarization direction of the reflective polarizing sheet 144 and reflect light polarized in a different direction from the predetermined polarization direction. In addition, the light reflected by the reflective polarizing sheet 144 may be recycled within the light source apparatus 100, and such light recycle may improve the luminance of the display apparatus 10.

The optical sheet 140 is not limited to the sheets or films shown in FIG. 4, and may further include a variety of sheets or films such as protective sheets, films, and the like.

The light source apparatus 100 may include the plurality of light sources 111, and may output surface light by diffusing the light emitted from the plurality of light sources 111. The liquid crystal panel 20 may include a plurality of pixels, and the plurality of pixels may be controlled to allow each of the plurality of pixels to transmit and/or block light. An image may be formed by light passing through each of the plurality of pixels.

In this instance, the display apparatus 10 may perform local dimming to vary a brightness of light for each region of the light source apparatus 100 in association with the output image to improve power consumption while increasing contrast.

For example, the display apparatus 10 may reduce the brightness of light of the light source 111 of the light source apparatus 100 corresponding to a dark portion of an image to make the dark portion of the image darker, and may increase the brightness of light of the light source 111 of the light source apparatus 100 corresponding to a bright portion of the image to make the bright portion of the image brighter. As a result, a contrast ratio of the image may be improved.

The display apparatus 10 may divide the light source apparatus 100 into a plurality of blocks, and for each block, the current may be adjusted independently according to an input image. Image transmission of the display apparatus 10 is performed through local dimming drives frame-by-frame, and the current driving is adjusted according to the number of divided blocks of the light sources 111 in the light source apparatus 100.

As a result, the display apparatus 10 may effectively improve a contrast ratio by lowering a supply current to the dimming blocks corresponding to regions where the input image is dark and increasing the supply current to the dimming blocks corresponding to regions where the input image is bright. The dimming blocks 200 may be disposed on the first side of the substrate 112.

Figure 5:
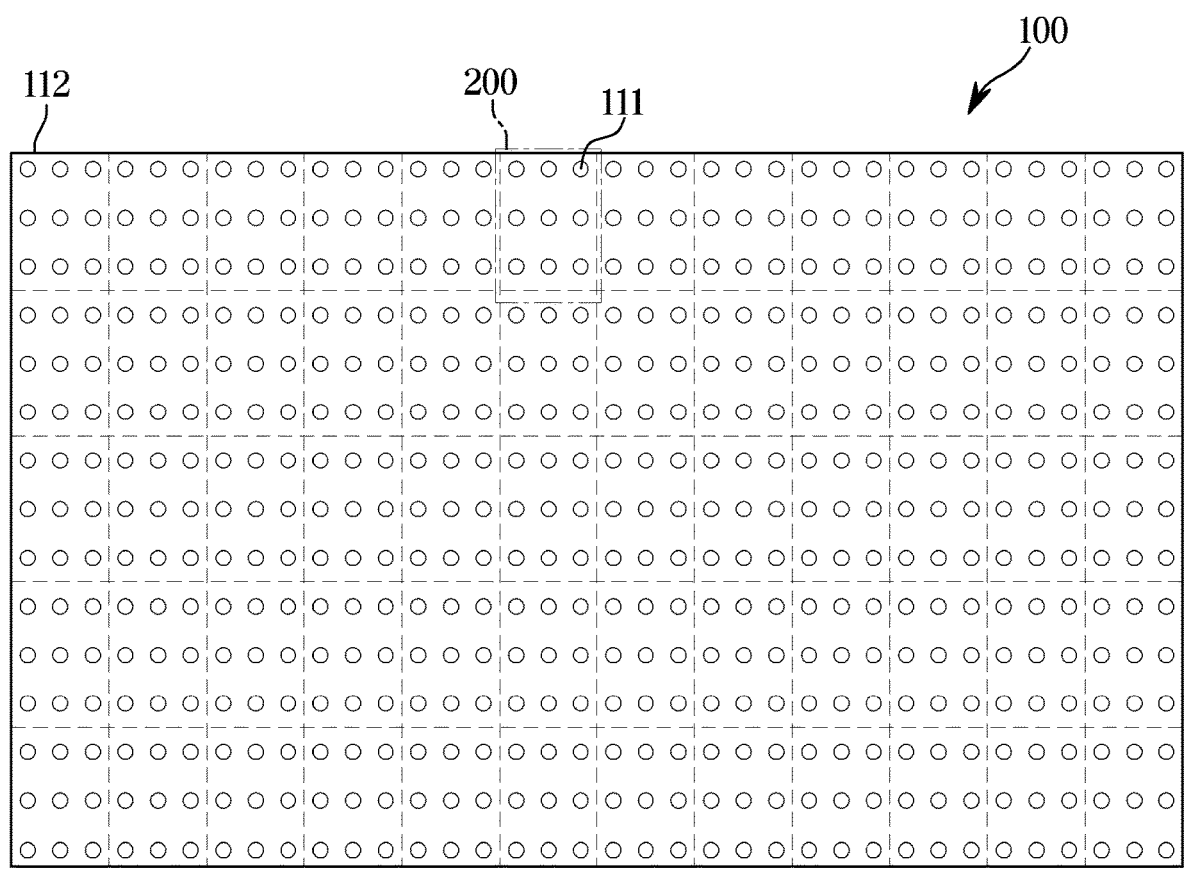
FIG. 5 is a diagram illustrating that a plurality of light sources are divided into a plurality of dimming blocks in a display apparatus according to an embodiment.

For local dimming, the plurality of light sources 111 included in the light source apparatus 100 may be divided into a plurality of dimming blocks 200. For example, the plurality of dimming blocks 200 may be arranged in five rows and twelve columns, totaling 60 dimming blocks, as shown in FIG. 5. However, the number of dimming blocks 200 is not limited to the above example.

FIG. 5 is a diagram illustrating that a plurality of light sources are divided into a plurality of dimming blocks in a display apparatus according to an embodiment.

Referring to FIG. 5, each of the plurality of dimming blocks 200 may include at least one light source 111. The light source apparatus 100 may supply the same driving current to the light sources 111 belonging to the same dimming block 200, and the light sources 111 belonging to the same dimming block 200 may emit light of the same brightness.

In addition, the light source apparatus 100 may supply different driving currents to the light sources 111 belonging to different dimming blocks 200 according to dimming data, and the light sources 111 belonging to different dimming blocks 200 may emit light of different brightness.

Each of the plurality of dimming blocks 200 may include, for example, N*M light sources arranged in an N*M matrix (N, M are natural numbers). An N*M matrix refers to a matrix with N rows and M columns.

Because each of the light sources 111 includes a Light Emitting Diode (LED), each of the plurality of dimming blocks 200 may include N*M Light Emitting Diodes (LEDs). According to various embodiments, each of the light sources 111 may further include an optical dome covering the LED. The optical dome may cover the LED. The optical dome may prevent or suppress damage to the LED due to external mechanical action and/or due to chemical action.

A thickness of the light source apparatus 100 may also be thinner to allow the display apparatus 10 to be thinner. To reduce the thickness of the light source apparatus 100, each of the plurality of light sources 111 becomes thinner and a structure thereof is simplified.

The LED constituting the light source 111 may be directly attached to the substrate 112 using a Chip On Board (COB) method. For example, the light source 111 may include an LED 190 in which an LED chip or an LED die is directly attached to the substrate 112 without separate packaging.

The LED constituting the light source 111 may be manufactured as a flip-chip type. In the flip-chip type LED 190, when an LED, which is a semiconductor element, is attached to the substrate 112, an electrode pattern of the semiconductor element may be directly fused to the substrate 112 without using an intermediate medium, such as a metal lead (wire) or a Ball Grid Array (BGA). As described above, because the metal lead (wire) or BGA is omitted, the light source 111 including the flip-chip type LED may be miniaturized.

Although the flip-chip type LED 190 directly fused to the substrate 112 in a chip on board method has been described above, the light source 111 is not limited to the flip-chip type LED. For example, the light source 111 may include a package-type LED.

The plurality of dimming blocks 200 may be disposed on the substrate 112. That is, N*M light emitting diodes may be disposed on the substrate 112.

Figure 6:
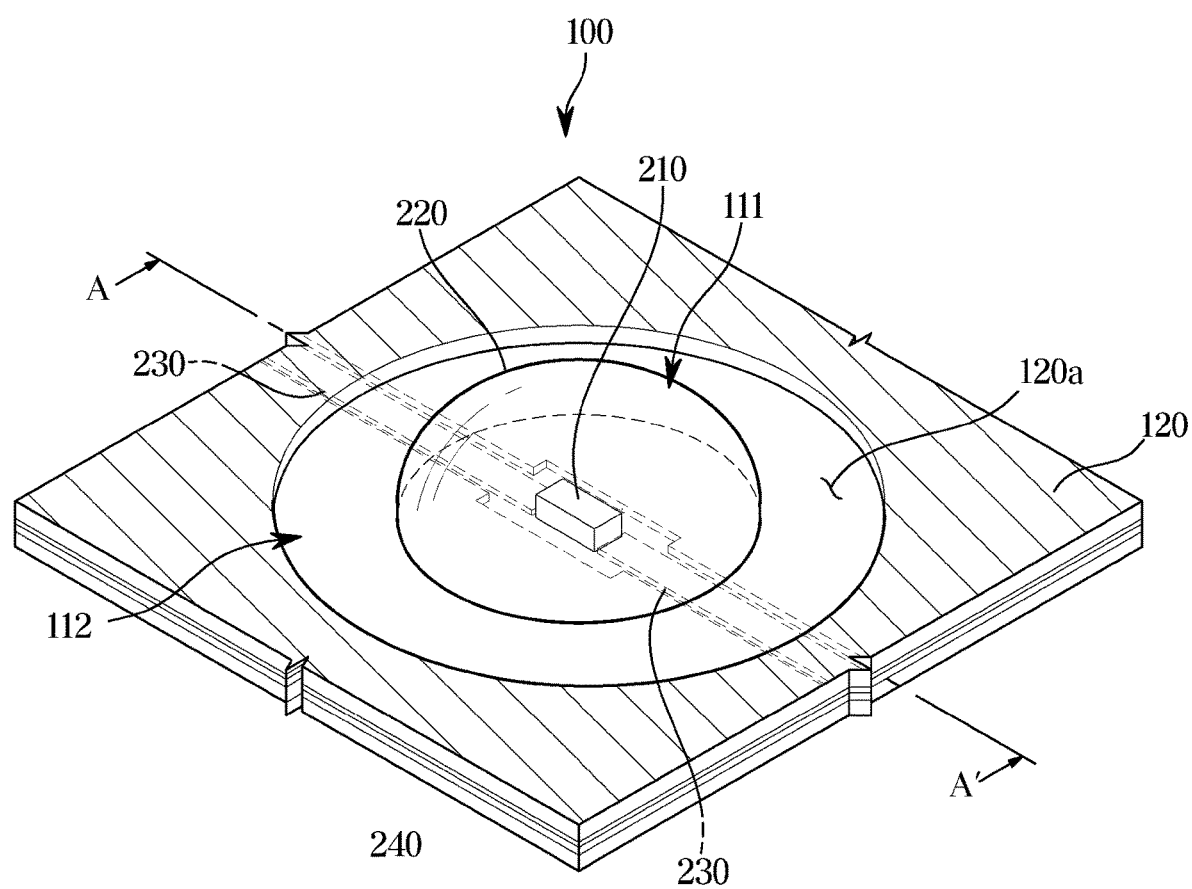
FIG. 6 is a perspective view of a light source included in a light source apparatus according to an embodiment.
Figure 7:
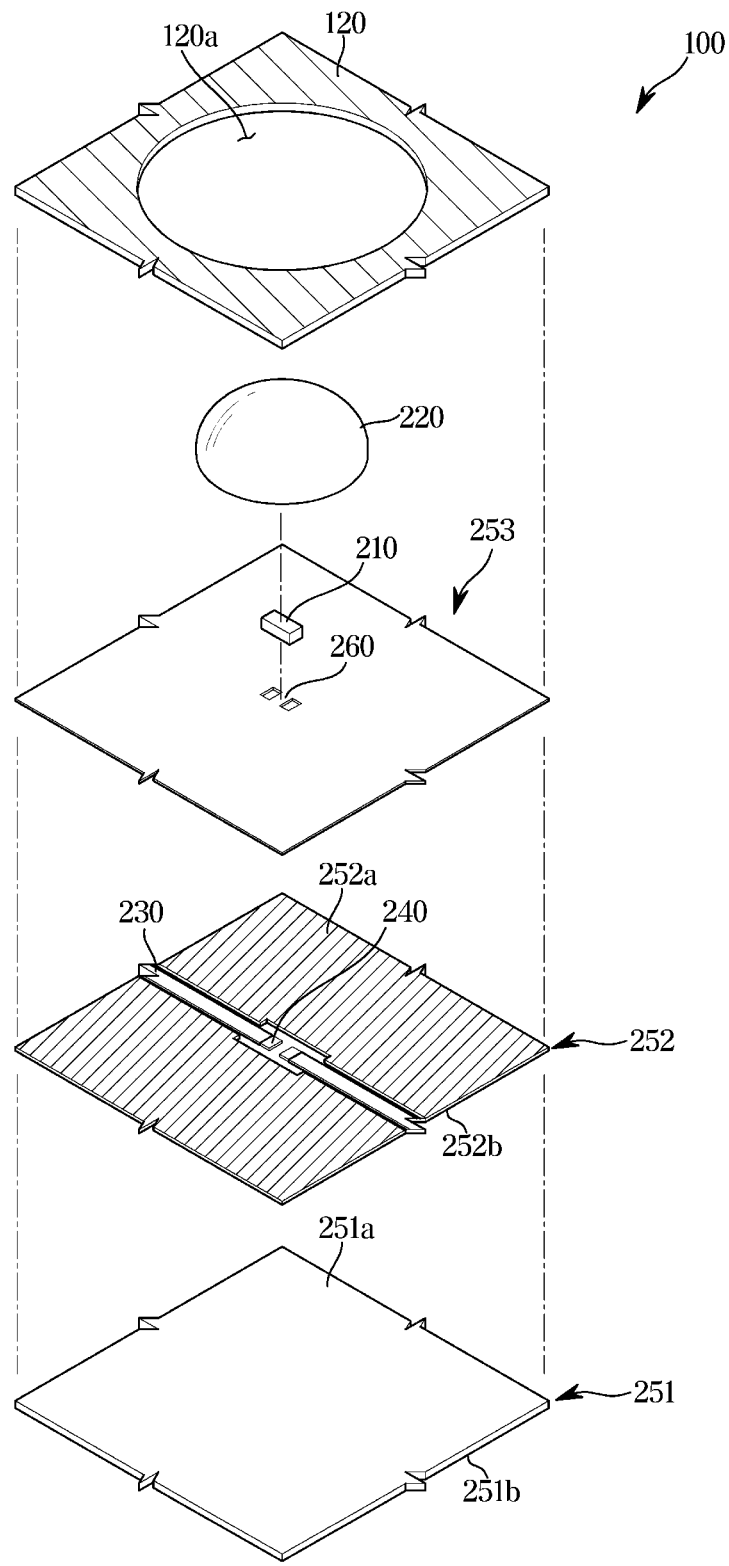
FIG. 7 is an exploded perspective view of the light source shown in FIG. 6.
Figure 8:
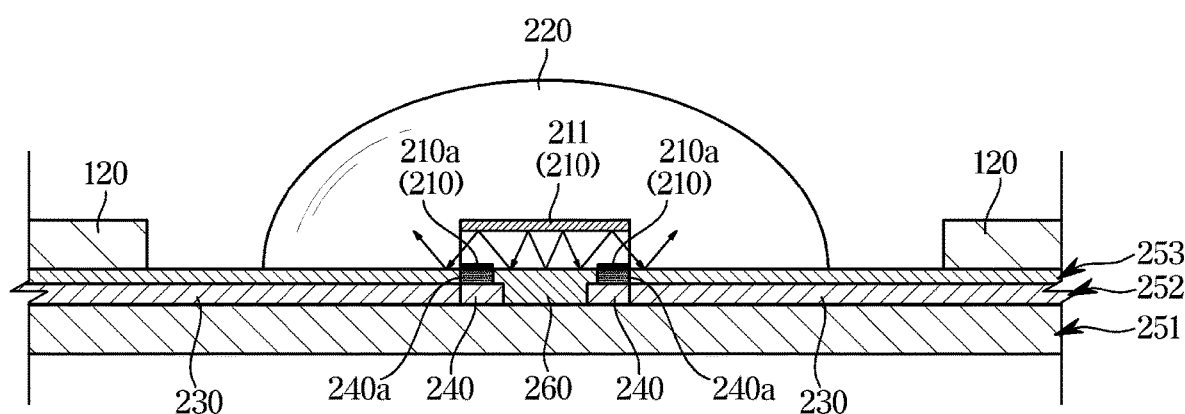
FIG. 8 is a side cross-sectional view taken along line A-A' of FIG. 6.

FIG. 6 is a perspective view of a light source included in a light source apparatus according to an embodiment. FIG. 7 is an exploded perspective view of the light source shown in FIG. 6. FIG. 8 is a side cross-sectional view taken along line A-A' of FIG. 6.

Referring to FIG. 6, FIG. 7 and FIG. 8, the light source module 110 includes the plurality of light sources 111. The plurality of light sources 111 may pass through the through hole 120a at the rear of the reflector sheet 120 and protrude forward of the reflector sheet 120. Accordingly, a portion of the light source 111 and the substrate 112 may be exposed toward the front of the reflector sheet 120 through the through hole 120a.

The light source 111 may include an electrical/mechanical structure located in an area defined by the through hole 120a of the reflector sheet 120. For example, each of the plurality of light sources 111 includes an LED 210 and an optical dome 220.

In order to improve the uniformity of surface light emitted by the light source apparatus 100 and improve the contrast ratio by local dimming, the number of light sources 111 may be increased.

The LED 210 may include a p-type semiconductor and an n-type semiconductor for emitting light by recombination of holes and electrons. In addition, the LED 210 may be provided with a pair of electrodes 210a for supplying electrons and holes to each of the p-type semiconductor and the n-type semiconductor.

The LED 210 may convert electric energy into optical energy. In other words, the LED 210 may emit light having the highest intensity at a predefined wavelength at which power is supplied. For example, the LED 210 may emit blue light having a peak value at a wavelength that represents blue color (e.g., a wavelength between 450 nm and 495 nm).

The LED 210 may be directly attached to the substrate 112 in a Chip On Board (COB) method. In other words, the light source 111 may include the LED 210 in which an LED chip or LED die is directly attached to the substrate 112 without separate packaging.

In order to reduce a region occupied by the LED 210, the LED 210 may be manufactured as a flip-chip type that does not include a Zener diode. In the flip-chip type LED 210, when an LED, which is a semiconductor element, is attached to the substrate 112, an electrode pattern of the semiconductor element may be directly fused to the substrate 112 without using an intermediate medium, such as a metal lead (wire) or a Ball Grid Array (BGA).

As described above, because the metal lead (wire) or BGA is omitted, the light source 111 including the flip-chip type LED 210 may be miniaturized.

In order to miniaturize the light source 111, the light source module 110 in which the flip-chip type LED 210 is attached to the substrate 112 in a COB method may be manufactured.

Although the flip-chip type LED 210 directly fused to the substrate 112 in a COB method has been described above, the light source 111 is not limited to the flip-chip type LED. For example, the light source 111 may include a package type LED.

The substrate 112 may be provided with a power feed line 230 and a power feed pad 240 for supplying power to the LED 210.

The substrate 112 may be provided with the power feed line 230 for supplying electrical signals and/or power from the control assembly 50 and/or power assembly 60 to the LED 210.

As shown in FIG. 8, the substrate 112 may be formed by alternately stacking a non-conductive insulation layer 251 and a conductive conduction layer 252.

The insulation layer 251 may include a first surface and a second surface, and the conduction layer 252 may also include a first surface and a second surface. The conduction layer 252 may be stacked on the first surface of the insulation layer 251.

According to various embodiments, the conduction layer 252 may not be provided on the second surface of the insulation layer 251. That is, in an embodiment, the substrate 112 may be a single-sided PCB.

In a case where the insulation layers 251 and the conduction layers 252 are alternately stacked, each of the conduction layers 252 may correspond to a respective layer of the multi-layer PCB. That is, in an embodiment, the substrate 112 may be a multi-layer PCB.

A line or pattern in which power and/or electrical signals pass is formed on the conduction layer 252. The conduction layer 252 may be formed of various electrically conductive materials. For example, the conduction layer 252 may be formed of various metal materials such as copper (Cu), tin (Sn), aluminum (Al), or an alloy thereof. The conduction layer 252 may be stacked on one side of the insulation layer 251.

A dielectric of the insulation layer 251 may insulate gaps between lines or patterns of the conduction layer 252. The insulation layer 251 may be formed of a dielectric for electrical insulation, such as FR-4.

The insulation layer 251 may include at least one via hole. The conduction layer 252 stacked on the first surface of the insulation layer 251 and the conduction layer 252 provided on the second surface of the insulation layer 251 may be electrically connected through the at least one via hole.

The power feed line 230 may be implemented by a line or pattern formed on the conduction layer 252. The power feed line 230 may be electrically connected to the LED 210 through the power feed pad 240. The power feed pad 240 may be formed by exposing the power feed line 230 to the outside.

A protection layer 253 may be formed in an outermost portion of the substrate 112 to prevent or suppress damages to the substrate 112 due to external shocks and/or chemical actions (e.g., corruption) and/or optical actions. The protection layer 253 may include a Photo Solder Resist (PSR).

As shown in FIG. 8, the protection layer 253 may cover the power feed line 230 to block the power feed line 230 from being exposed to the outside.

For electrical contact between the power feed line 230 and the LED 210, a window may be formed at the protection layer 253 to expose a portion of the power feed line 230 to the outside. A portion of the power feed line 230 exposed through the window of the protection layer 253 may form the power feed pad 240.

A conductive adhesive material 240a is applied onto the power feed pad 240 for electrical contact between the power feed line 230 exposed to the outside and the electrode 210a of the LED 210. The conductive adhesive material 240a may be applied within the window of protection layer 253.

The electrode 210a of the LED 210 may contact the conductive adhesive material 240a, and the LED 210 may be electrically connected to the power feed line 230 through the conductive adhesive material 240a.

For example, the conductive adhesive material 240a may include electrically conductive solder, without being limited thereto. The conductive adhesive material 240a may include electrically conductive epoxy adhesives.

Power may be supplied to the LED 210 through the power feed line 230 and the power feed pad 240, and the LED 210 may emit light when powered. A pair of power feed pads 240 may be provided to correspond to the pair of electrodes 210a, respectively, provided in the flip-chip type LED 210.

The optical dome 220 may cover the LED 210. The optical dome 220 may prevent or suppress damage to the LED 210 due to external mechanical action and/or due to chemical action.

For example, the optical dome 220 may be shaped like a dome obtained by cutting a sphere without including the center, or may be shaped like a semi-sphere obtained by cutting the sphere with the center included. A vertical cross-section of the optical dome 220 may have, for example, an arcuate form or a semi-circular form.

The optical dome 220 may be formed of silicone or epoxy resin. For example, melted silicon or epoxy resin is discharged onto the LED 210 through a nozzle, etc., and then the discharged silicon or epoxy resin is cured, thereby forming the optical dome 220.

Accordingly, the optical dome 220 may have various shapes depending on the viscosity of the liquid silicone or epoxy resin. For example, in a case where the optical dome 220 is manufactured using silicon with a thixotropic index of approximately 2.7 to 3.3 (e.g., 3.0), the optical dome 220 may be formed to have a dome ratio (height/base diameter) of approximately 2.5 to 3.1 (e.g., 2.8). Here, the dome ratio represents a ratio of the height of the dome to the diameter of the bottom of the dome. For example, the optical dome 220 formed of silicon with a thixotropic index of approximately 2.7 to 3.3 (e.g., 3.0) may have a base diameter of approximately 2.5 mm and a height of approximately 0.7 mm.

The optical dome 220 may be optically transparent or translucent. Light emitted from the LED 210 may pass through the optical dome 220 and be emitted to the outside.

In this instance, the dome-shaped optical dome 220 may refract light like a lens. For example, the light emitted from the LED 210 may be refracted and dispersed by the optical dome 220.

As such, the optical dome 220 may not only protect the LED 210 from external mechanical action and/or chemical action or electrical action, but also disperse the light emitted from the LED 210.

An antistatic member is formed near the optical dome 220 to protect the LED 210 from electrostatic discharge. The antistatic member may absorb electrical shock caused by electrostatic discharge generated near the optical dome 220.

Referring to FIG. 8, the light source module 110 may include the non-conductive insulation layer 251, the conductive conduction layer 252 stacked on the front side of the insulation layer 251 and provided with the power feed line 230, and the non-conductive protection layer 253 stacked on the front side of the conduction layer 252.

The LED 210 may be disposed on the protection layer 253. More specifically, the LED 210 may be disposed on the front side of the substrate 112 to cover the window formed on the protection layer 253.

A pair of power feed pads 240 may be formed on the conduction layer 252 and may be connected to the power feed line 230. The pair of power feed pads 240 may be electrically connected to the LED 210 through the window formed on the protection layer 253. The pair of power feed pads 240 may be arranged separately from each other.

The light source module 110 may include a reflective auxiliary layer 260.

According to an embodiment, the reflective auxiliary layer 260 along with the protection layer 253 is formed between the pair of power feed pads 240, thereby reducing a defect rate due to size asymmetry of the pair of power feed pads 240.

The LED 210 may include a Distributed Bragg Reflector (DBR) layer 211.

The DBR layer 211 is a multilayer reflector formed of two materials with different refractive indices. Due to differences in refractive index of each material, Fresnel reflection occurs at an interface of each DBR layer 211. Accordingly, because light incident on the DBR layer may be reflected at a wide range of angles, a light beam angle of the LED 210 may be set to approximately 165 degrees or more.

The light emitted from the LED 210 may be reflected by the DBR layer 211 and re-reflected by the reflective auxiliary layer 260. As a result, loss of light traveling into a space between the pair of power feed pads 240 may be prevented.

Specifically, because the reflective auxiliary layer 260 is formed of a material having a higher reflectivity than the insulation layer 251, by covering the front of the insulation layer 251, light loss caused by the insulation layer 251 that absorbs light traveling to the rear of the LED 210 may be minimized.

Figure 9:
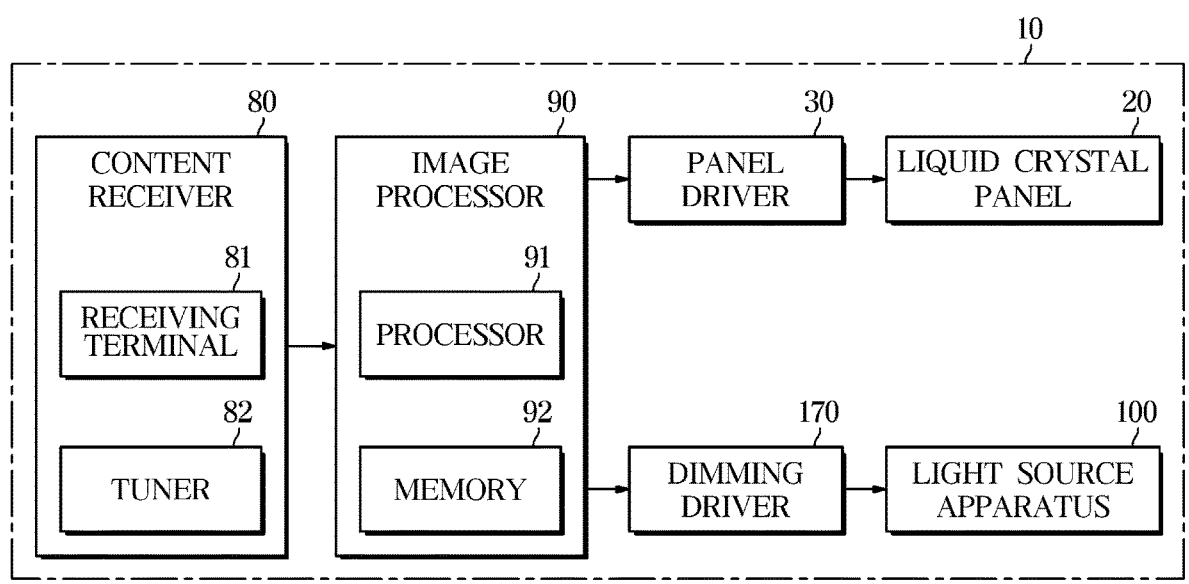
FIG. 9 is a control block diagram of a display apparatus according to an embodiment.

FIG. 9 is a control block diagram of a display apparatus according to an embodiment.

Referring to FIG. 9, the display apparatus 10 may include a content receiver 80, an image processor 90, a panel driver 30, a liquid crystal panel 20, a dimming driver 170, and the light source apparatus 100.

The content receiver 80 may include a tuner 82 and a receiving terminal 81 receiving content including a video signal and/or audio signal from content sources.

The receiving terminal 81 may receive the video signal and audio signal from content sources through a cable. For example, the receiving terminal 81 may include a component (YPbPr/RGB) terminal, a Composite Video Blanking and Sync (CVBS) terminal, an audio terminal, a High Definition Multimedia Interface (HDMI) terminal, and a Universal Serial Bus (USB) terminal.

The tuner 82 may receive a broadcast signal from a broadcast reception antenna or a wired cable. In addition, the tuner 82 may extract a broadcast signal of a channel selected by a user from among broadcast signals. For example, the tuner 82 may pass a broadcast signal having a frequency corresponding to the channel selected by the user among a plurality of broadcast signals received through the broadcast reception antenna or wired cable, and may block a broadcast signal having a different frequency.

As described above, the content receiver 80 may receive the video signal and/or audio signal from the content sources through the receiving terminal 81 and/or the tuner 82. The content receiver 80 may output the video signal and/or audio signal received through the receiving terminal 81 and/or the tuner 82 to the image processor 90.

The image processor 90 may include a processor 91 processing image data, and a memory 92 storing programs and data for processing the image data.

The memory 92 may store programs and data for processing a video signal and/or an audio signal. In addition, the memory 92 may temporarily store data generated while processing the video signal and/or audio signal.

The memory 92 may include a non-volatile memory such as Read Only Memory (ROM) and flash memory, and a volatile memory such as Static Random Access Memory (S-RAM), Dynamic Random Access Memory (D-RAM), and the like.

The processor 91 may receive the video signal and/or audio signal from the content receiver 80. The processor 91 may decode the video signal into image data. The processor 91 may generate dimming data from the image data. In addition, the processor 91 may output the image data and the dimming data to the panel driver 30 and the dimming driver 170, respectively.

As such, the image processor 90 may generate the image data and the dimming data from the video signal obtained by the content receiver 80. The image processor 90 may also transmit the image data and the dimming data to the liquid crystal panel 20 and the light source apparatus 100, respectively.

The image data may include information about an intensity of light transmitted by each of a plurality of pixels (or a plurality of subpixels) included in the liquid crystal panel 20. The image data may be provided to the liquid crystal panel 20 through the panel driver 30.

The liquid crystal panel 20 may include a plurality of pixels capable of transmitting or blocking light, and the plurality of pixels are arranged in a matrix form. In other words, the plurality of pixels may be arranged in a plurality of rows and a plurality of columns.

The panel driver 30 may receive the image data from the image processor 90. The panel driver 30 may drive the liquid crystal panel 20 according to the image data. In other words, the panel driver 30 may convert image data, which is a digital signal (hereinafter, referred to as 'digital image data'), into an analog image signal, which is an analog voltage signal. The panel driver 30 may provide the converted analog image signal to the liquid crystal panel 20. Optical properties (e.g., light transmittance) of the plurality of pixels included in the liquid crystal panel 20 may change according to the analog image signal.

The panel driver 30 may include, for example, a timing controller, a data driver, a scan driver, and the like.

The timing controller may receive the image data from the image processor 90. The timing controller may output image data and a drive control signal to the data driver and the scan driver. The drive control signal may include a scan control signal and a data control signal. The scan control signal and the data control signal may be used to control operations of the scan driver and the data driver, respectively.

The scan driver may receive a scan control signal from the timing controller. The scan driver may activate any one of the plurality of rows in the liquid crystal panel 20 according to the scan control signal. In other words, the scan driver may convert pixels, included in a single row among the plurality of pixels arranged in the plurality of rows and the plurality of columns, into a state capable of receiving an analog image signal. In this instance, other pixels except for the pixels activated by the scan driver may not receive the analog image signal.

The data driver may receive the image data and the data control signal from the timing controller. The data driver may output the image data to the liquid crystal panel 20 according to the data control signal. For example, the data driver may receive the digital image data from the timing controller. The data driver may convert the digital image data into an analog image signal. In addition, the data driver may provide the analog image signal to the pixels included in any one row activated by the scan driver. In this instance, the pixels activated by the scan driver may receive the analog image signal. Optical properties (e.g., light transmittance) of the activated pixels may change according to the received analog image signals.

As described above, the panel driver 30 may drive the liquid crystal panel 20 according to image data. As a result, an image corresponding to the image data may be displayed on the liquid crystal panel 20.

In an embodiment, dimming data may include information about an intensity of light emitted by each of the plurality of light sources 111 (or the plurality of dimming blocks 200) included in the light source apparatus 100. The dimming data may be provided to the light source apparatus 100 through the dimming driver 170.

The light source apparatus 100 may include the plurality of light sources 111 that emit light. The plurality of light sources 111 are arranged in a matrix form. In other words, the plurality of light sources 111 may be arranged in a plurality of rows and a plurality of columns.

The light source apparatus 100 may be divided into a plurality of dimming blocks 200. In addition, each of the plurality of dimming blocks 200 may include at least one light source.

The light source apparatus 100 may output surface light by diffusing light emitted from the plurality of light sources 111. The liquid crystal panel 20 may include a plurality of pixels, and may control each of the plurality of pixels to pass or block light. An image may be formed by light passing through each of the plurality of pixels.

In this instance, the light source apparatus 100 may turn off a plurality of light sources corresponding to a dark part of the image in order to make the dark part of the image darker. Accordingly, the dark part of the image becomes darker, thereby improving a contrast ratio of the image.

As described above, the light source apparatus 100 controls the plurality of light sources to emit light in an area corresponding to a bright part of the image and controls the plurality of light sources not to emit light in an area corresponding to the dark part of the image, which is hereinafter referred to as "local dimming".

For local dimming, the plurality of light sources 111 included in the light source apparatus 100 may be divided into a plurality of dimming blocks 200, as shown in FIG. 5. In FIG. 5, a total of 60 dimming blocks in five rows and twelve columns are shown, but the number and arrangement of dimming blocks are not limited to that shown in FIG. 5.

Each of the plurality of dimming blocks 200 may include at least one light source 111. The light source apparatus 100 may supply the same driving current to light sources belonging to the same dimming block 200, and the light sources belonging to the same dimming block 200 may emit light of the same brightness. For example, light sources belonging to the same dimming block 200 are connected to each other in series, and thus the same driving current may be supplied to the light sources belonging to the same dimming block 200.

In addition, the light source apparatus 100 may further include a plurality of driving devices 300 controlling driving current supplied to light sources included in each of the plurality of dimming blocks 200. The driving devices 300 may be provided (e.g. disposed) to correspond to at least one dimming block 200 each. In other words, each of the driving devices 300 may drive each of the dimming blocks 200.

The driving device 300 may be a driving integrated circuit chip for driving the plurality of dimming blocks 200.

As described above, because the light sources 111 belonging to the dimming block 200 are connected to each other in series, the light sources 111 included in the dimming block 200 may operate as one unit and form a light source block.

Accordingly, hereinafter, "supplying a driving current to a dimming block" may be interpreted as "supplying a driving current to light sources included in a dimming block".

Although dimming blocks each including nine light sources are shown in FIG. 5, the number and arrangement of light sources included in each dimming block is not limited to that shown in FIG. 5.

As described above, the image processor 90 may provide dimming data for local dimming to the light source apparatus 100. The dimming data may include information about a luminance of each of the plurality of dimming blocks 200. For example, the dimming data may include information about an intensity of light output by the light sources included in each of the plurality of dimming blocks 200.

The image processor 90 may obtain the dimming data from the image data.

The image processor 90 may convert the image data into the dimming data in various manners. For example, the image processor 90 may divide an image I based on the image data into a plurality of image blocks. The number of the plurality of image blocks is equal to the number of the plurality of dimming blocks 200, and the plurality of image blocks may correspond to the plurality of dimming blocks 200, respectively.

The image processor 90 may obtain a luminance value of the plurality of dimming blocks 200 from the image data of the plurality of image blocks. The image processor 90 may also generate the dimming data by combining the luminance values of the plurality of dimming blocks 200.

For example, the image processor 90 may obtain a luminance value of each of the plurality of dimming blocks 200 based on a maximum value among luminance values of pixels included in each of the image blocks.

A single image block includes a plurality of pixels, and image data of a single image block may include image data of a plurality of pixels (e.g., red data, green data, blue data, etc.). The image processor 90 may calculate the luminance value of each of the pixels based on the image data of each of the pixels.

The image processor 90 may determine the maximum value among the luminance values of pixels included in an image block as a luminance value of the dimming block 200 corresponding to the image block. For example, the image processor 90 may determine a maximum value among luminance values of pixels included in the $i^{th}$ image block as a luminance value of the $i^{th}$ dimming block, and may determine a maximum value among luminance values of pixels included in the $j^{th}$ image block as a luminance value of the $j^{th}$ dimming block.

The image processor 90 may generate dimming data by combining the luminance values of the plurality of dimming blocks 200.

The dimming driver 170 may receive the dimming data from the image processor 90. The dimming driver 170 may drive the light source apparatus 100 according to the dimming data. Here, the dimming data may include information about a luminance of each of the plurality of dimming blocks 200 or information about a brightness of the light sources included in each of the plurality of dimming blocks 200.

The dimming driver 170 may include, for example, a timing controller, a data driver, a scan driver, and the like.

The dimming driver 170 may convert the dimming data, which is a digital voltage signal, into an analog driving current.

For example, the dimming driver 170 may sequentially provide an analog dimming signal to the driving devices 300 corresponding respectively to the dimming blocks 200, in an active matrix method.

The plurality of dimming blocks 200 may be divided into a plurality of groups. A driving current may be supplied simultaneously to the dimming blocks 200 belonging to the same group, and a driving current may be supplied sequentially at different times to the dimming blocks 200 belonging to different groups. The dimming driver 170 may activate the dimming blocks 200 belonging to any one of the plurality of groups, and provide an analog dimming signal to the activated dimming blocks 200. Thereafter, the dimming driver 170 may activate the dimming blocks 200 belonging to another group and provide an analog dimming signal to the activated dimming blocks 200.

For example, the dimming blocks 200 located in the same row may belong to the same group, and the dimming blocks 200 located in different rows may belong to different groups, but the group classification method is not limited thereto. The dimming driver 170 may activate the dimming blocks 200 belonging to a single group and provide an analog dimming signal to the activated dimming blocks 200. Thereafter, the dimming driver 170 may activate the dimming blocks 200 in another row and provide an analog dimming signal to the activated dimming blocks 200.

In order to activate the dimming blocks 200 belonging to any one of the plurality of groups, the dimming driver 170 may transmit a driving signal to the driving device 300. The driving signal may be a signal for supplying power to the driving device 300.

According to various embodiments, the driving signal may be transmitted directly from the dimming driver 170 to each of the plurality of dimming blocks 200, or may be transmitted from the driving device 300 to each of the plurality of dimming blocks 200.

A driving circuit of each of the dimming blocks 200 may provide an analog driving current corresponding to an analog dimming signal to the light source module 110. The light sources 111 included in the light source module 110 may emit light by the analog driving current. The light sources belonging to the same dimming block 200 may emit light of the same intensity according to the dimming data. In addition, the light sources belonging to different dimming blocks 200 may emit light of different intensities according to the dimming data.

Figure 10:
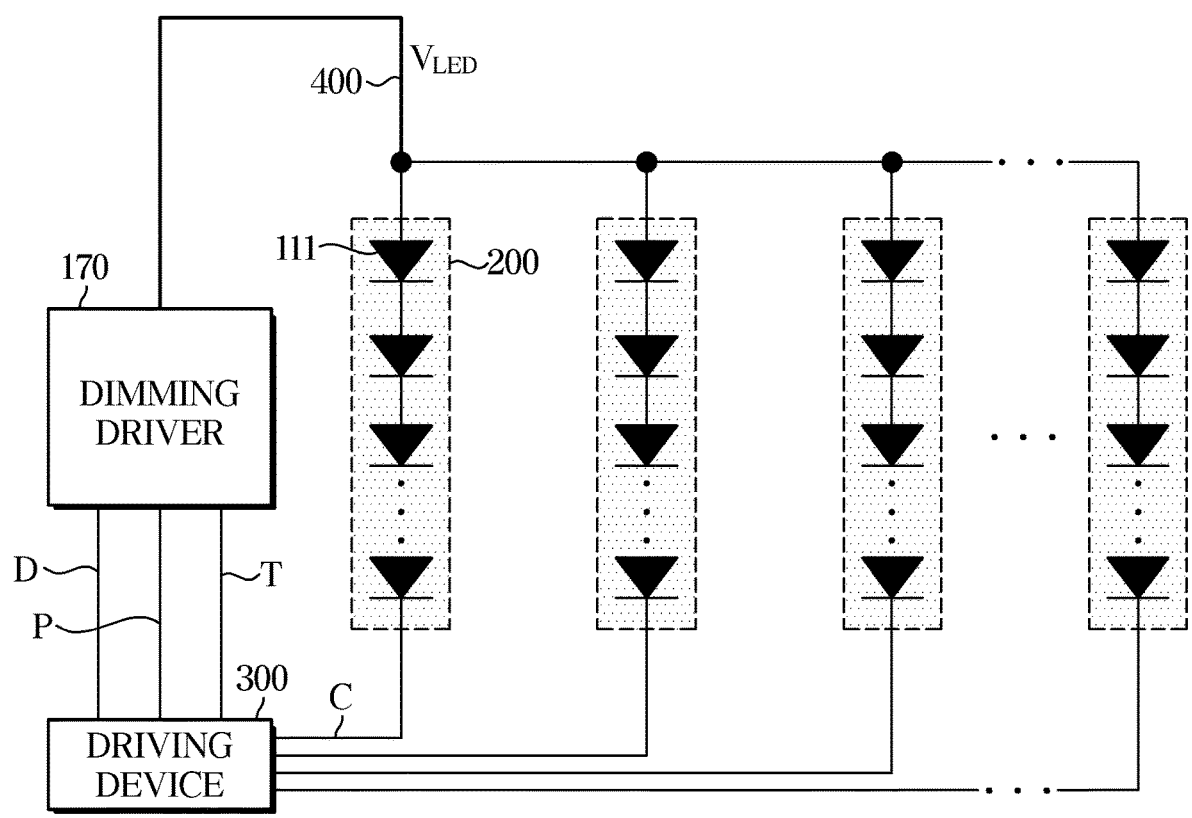
FIG. 10 illustrates an example of a connection structure of a dimming driver, a driving device, and a diming block according to an embodiment.
Figure 11:
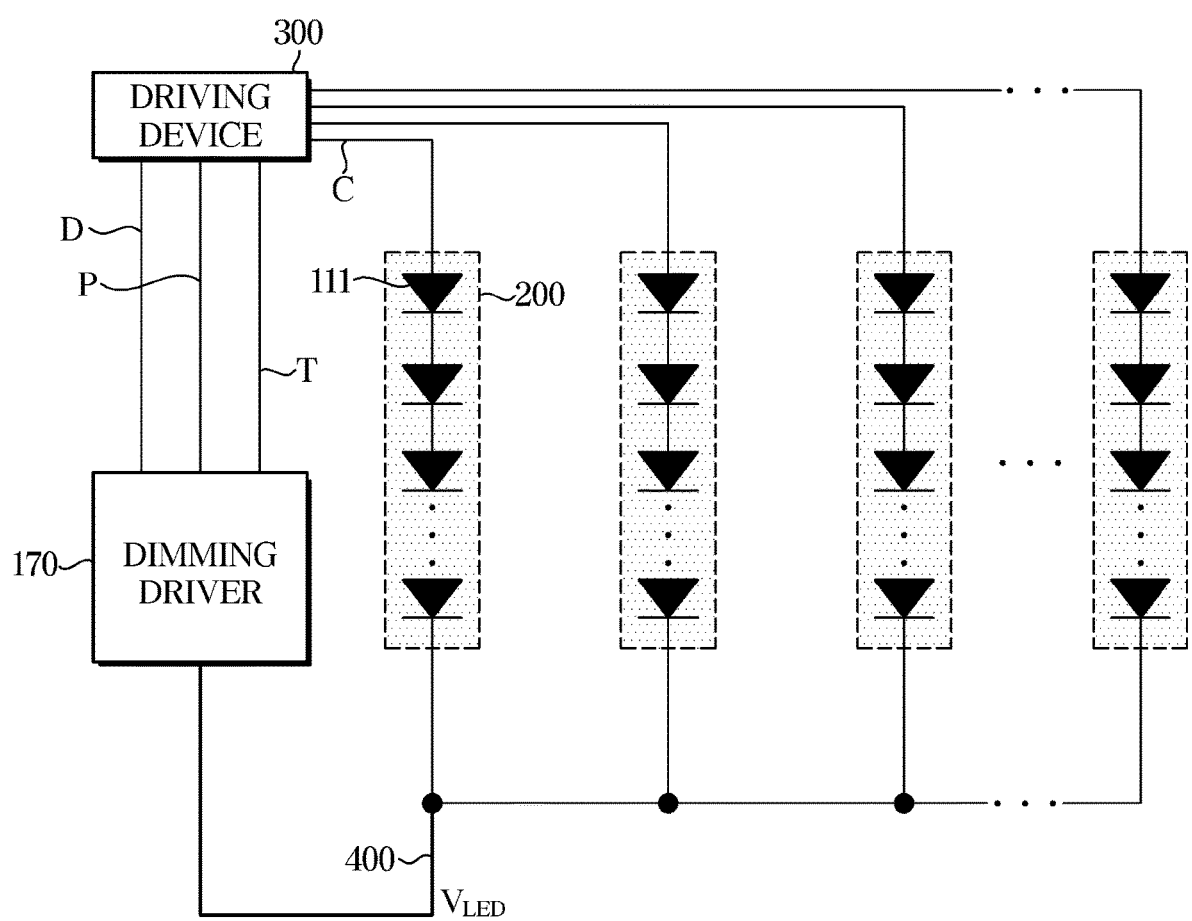
FIG. 11 illustrates an example of a connection structure of a dimming driver, a driving device, and a diming block according to an embodiment.

FIG. 10 and FIG. 11 illustrate an example of a connection structure of a dimming driver, a driving device, and a diming block according to an embodiment.

Referring to FIG. 10, each of the plurality of dimming blocks 200 may include a plurality of light sources (LEDs) 111 connected to each other in series.

In an embodiment, each of the plurality of dimming blocks 200 may be supplied with a driving voltage $V_{LED}$ through a driving line 400.

In an embodiment, each of the plurality of dimming blocks 200 may be electrically connected to the driving device 300 through a control line C. The driving device 300 may control the driving current flowing through each of the plurality of dimming blocks 200 through the control line C.

Assuming that a single dimming block 200 includes a first LED, a second LED, a third LED, and a fourth LED, an anode of the first LED may be connected to the driving line 400, a cathode of the first LED may be connected to an anode of the second LED, a cathode of the second LED may be connected to an anode of the third LED, a cathode of the third LED may be connected to an anode of the fourth LED, and a cathode of the fourth LED may be connected to the driving device 300 through the control line C.

That is, among the plurality of light sources 111 included in a single dimming block 200 and connected in series, the first light source 111 in the series connection may be connected to the driving line 400 to receive the driving voltage $V_{LED}$, and the last light source 111 in the series connection may be connected to the driving device 300 through the control line C.

The driving device 300 may receive a power signal from the dimming driver 170 and operate in response to receiving the power signal. The driving device 300 may receive a timing signal from the dimming driver 170 and activate the plurality of dimming blocks 200 in response to receiving the timing signal.

The power signal may include a driving voltage for supplying power to the driving device 300.

In an embodiment, the dimming driver 170 may output a power signal through a power line P.

In an embodiment, the driving device 300 may receive a power signal through the power line P.

The driving device 300 may receive an analog dimming signal from the dimming driver 170 while activated by the dimming driver 170, and store the received analog dimming signal. In addition, while inactivated, the plurality of driving devices 300 may supply driving current corresponding to the stored analog dimming signal to the plurality of light sources (LEDs) 111.

The driving device 300 may control the driving current supplied to each of the plurality of dimming blocks 200 through the control line C in a state where the driving voltage $V_{LED}$ is applied to the plurality of dimming blocks 200.

The analog dimming signal may include a data signal and/or a timing signal.

The data signal may include luminance value data corresponding to the plurality of dimming blocks 200, and the timing signal may include data about timing for operating the plurality of dimming blocks 200 based on the luminance value data corresponding to the plurality of dimming blocks 200.

The driving device 300 may activate the dimming block 200 in any one row of the plurality of dimming blocks 200 based on a timing control signal, and may control a driving current supplied to the activated dimming block 200 based on the data signal.

The display apparatus 10 may include a timing line T for providing a timing signal to the plurality of driving devices 300. The display apparatus 10 may further include a data line D for providing a data signal to the plurality of driving devices 300.

In addition, the display apparatus 10 may include the power line P for providing a driving voltage to the plurality of driving devices 300.

The timing line T, the data line D, and the power line P may be formed on the substrate 112. According to various embodiments, the driving line 400 may be formed on the substrate 112.

The plurality of driving devices 300 may include circuits with various topologies to implement active matrix driving.

For example, each of the plurality of driving devices 300 may include a circuit with a one capacitor two transistor (1C2T) topology. However, the circuit structure of the driving device 300 is not limited thereto. For example, the driving device 300 may include a 3T1C topology circuit with an additional transistor to compensate for a body effect of a driving transistor.

For example, the driving device 300 may be provided as a single chip with an integrated driving circuit. In other words, a driving circuit may be integrated into one semiconductor chip.

The dimming driver 170 may transmit dimming data corresponding to an input image to the plurality of driving devices 300 through the data line D.

In addition, the dimming driver 170 may transmit a timing signal corresponding to a light emission time of the plurality of dimming blocks 200 to the plurality of driving devices 300 through the timing line T.

The plurality of driving devices 300 may control the driving current supplied to each of the plurality of dimming blocks 200 based on the dimming data and the timing signal.

In FIG. 10, only a portion of the plurality of dimming blocks 200 are shown. The display apparatus 10 according to an embodiment requires more dimming blocks 200 for local dimming, driving devices 300, power lines P transmitting a power signal to the driving devices 300, data lines D and timing lines T connecting the driving devices 300 and the dimming blocks 200, driving lines 400 supplying power to the dimming blocks 200, and control lines C for controlling the dimming blocks 200.

Accordingly, it is required to simplify the arrangement of the data lines D, timing lines T, power lines P, control lines C, and driving lines 400 on the substrate 112.

In a case where the data lines D, timing lines T, power lines P, control lines C, and driving lines 400 intersect each other on the substrate 112, a plurality of conduction layers 252 and insulation layers 251 are required, which may increase circuit complexity.

Referring to FIG. 11, according to various embodiments, the driving device 300 may be electrically connected to an anode of the LED 111 included in the dimming block 200 through the control line C.

According to various embodiments, the driving line 400 may be electrically connected to a cathode of the LED 111 included in the dimming block 200.

In an embodiment, the driving line 400 may be connected to ground. In an embodiment, the LED 111 may receive a predetermined voltage $V_{LED}$ through the driving line 400. In this instance, the driving line 400 may be connected to ground and may have a relatively low voltage value.

In response to the driving device 300 being electrically connected to the anode of the LED 111 included in the dimming block 200 through the control line C, the driving device 300 controls a driving voltage applied to the anode of the LED 111 through the control line C, thereby controlling a driving current applied to the dimming block 200.

Figure 12:
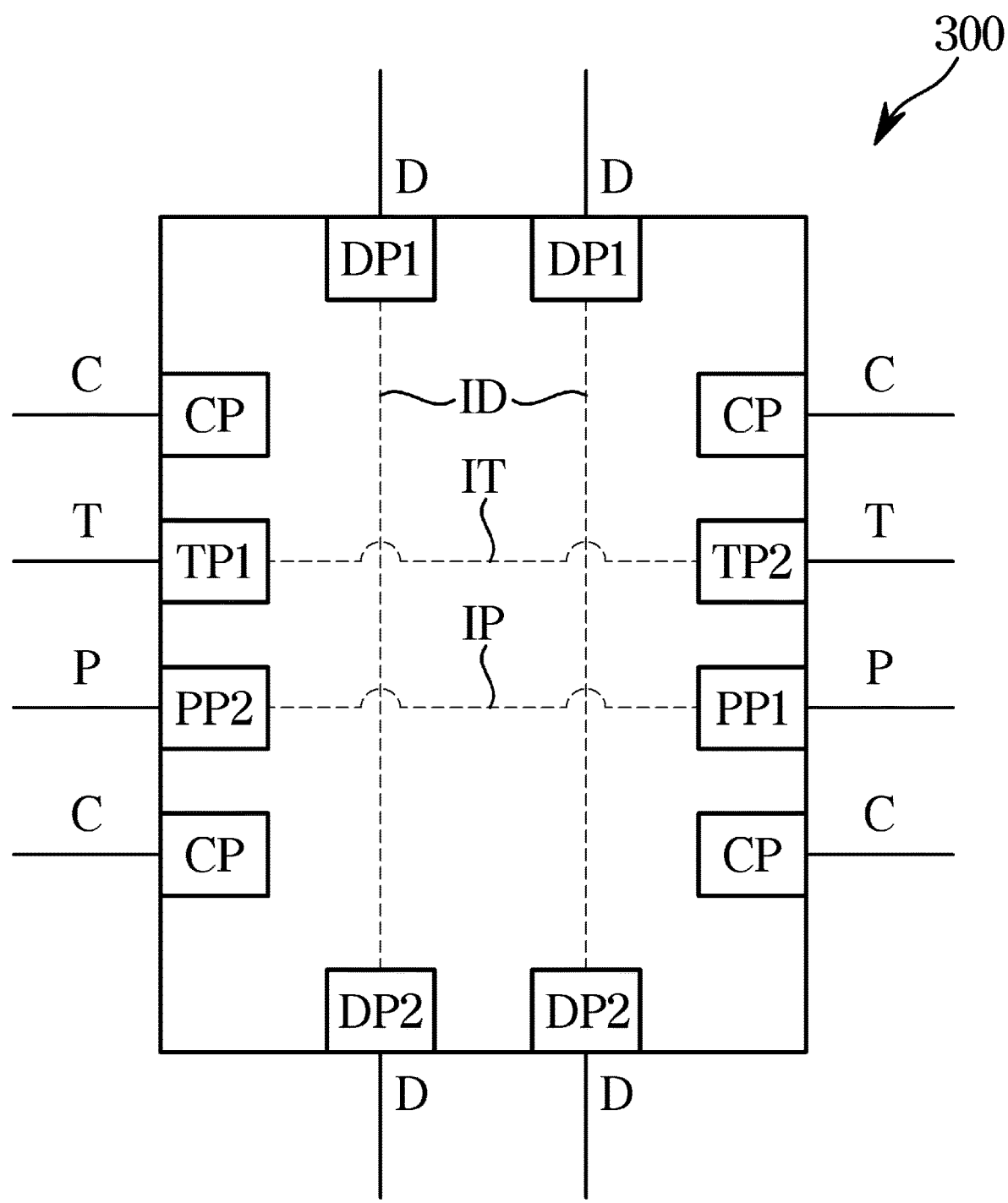
FIG. 12 schematically illustrates a plurality of pins provided in a driving device and a signal line connected to each of the plurality of pins according to an embodiment.

FIG. 12 schematically illustrates a plurality of pins provided in a driving device and a signal line connected to each of the plurality of pins according to an embodiment.

Referring to FIG. 12, the driving device 300 according to an embodiment may be a driving integrated circuit chip. In an embodiment, the driving device may be directly attached to the substrate 112 in a Chip On Board (COB) method. In another embodiment, the driving device may be molded on the substrate 112 on which a plurality of signal lines are formed (e.g. disposed).

The driving device 300 may include a plurality of pins TP1, TP2, PP1, PP2, DP1, DP2, CP. The plurality of pins TP1, TP2, PP1, PP2, DP1, DP2, CP may include at least one receiving pin TP1, PP1, DP1 receiving a signal, and at least one transmission pin TP2, PP2, DP2, CP transmitting a signal.

The plurality of pins may be electrically connected to at least one signal line T, P, D, C formed (e.g. disposed) on the substrate 112.

The at least one signal line T, P, D, C connected to the plurality of pins may include at least one of a timing line T, a data line D, or a power line P.

The plurality of pins TP1, TP2, PP1, PP2, DP1, DP2, CP may each include at least one input pin TP1, PP1, DP1 electrically connected to the at least one signal line T, P, D, respectively.

The plurality of pins TP1, TP2, PP1, PP2, DP1, DP2, CP may each include at least one output pin TP2, PP2, DP2 electrically connected to the at least one input pin TP1, PP1, DP1.

For example, the plurality of pins may include a pair of pins TP1 and TP2 connected to the timing line T.

The pair of pins TP1 and TP2 connected to the timing line T may include the input pin TP1 and the output pin TP2.

The input pin TP1 and the output pin TP2 may be placed opposite to each other. For example, in a case where the input pin TP1 is provided on a first side of the driving device 300, the output pin TP2 may be provided on the opposite side of the first side.

According to the disclosure, a timing signal transmitted from one side of the driving device 300 through the timing line T may be easily transmitted to the other side of the driving device 300.

For example, as shown in FIG. 12, the input pin TP1 may be provided on a left side (e.g. first side or second side) of the driving device 300, and the output pin TP2 may be provided on a right side (e.g. second side or first side) of the driving device 300. However, the positions of the input pin TP1 and output pin TP2 are not limited thereto.

According to various embodiments, the input pin TP1 may be provided on the right side (e.g. first side or second side) of the driving device 300, and the output pin TP2 may be provided on the left side (e.g. second side or first side) of the driving device 300.

A pair of pins DP1 and DP2 connected to the data line D may include the input pin DP1 and the output pin DP2.

According to various embodiments, at least one data line D connected to a single driving device 300 may exist.

In a case where a plurality of data lines D connected to a single driving device 300 exist, the single driving device 300 may control the dimming blocks 200 arranged in a plurality of columns.

The input pin DP1 and the output pin DP2 may be placed opposite to each other. For example, in a case where the input pin DP1 is provided on the first side of the driving device 300, the output pin DP2 may be provided on the opposite side of the first side.

According to the disclosure, a data signal transmitted from one side of the driving device 300 through the data line D may be easily transmitted to the other side of the driving device 300.

For example, as shown in FIG. 12, the input pin DP1 may be provided on an upper side (e.g. second end) of the driving device 300, and the output pin DP2 may be provided on a lower side (e.g. first end) of the driving device 300. However, the positions of the input pin DP1 and output pin DP2 are not limited thereto.

According to various embodiments, the input pin DP1 may be provided on the lower side of the driving device 300, and the output pin DP2 may be provided on the upper side of the driving device 300.

A pair of pins PP1 and PP2 connected to the power line P may include the input pin PP1 and the output pin PP2.

The input pin PP1 and the output pin PP2 may be placed opposite to each other. For example, in a case where the input pin PP1 is provided on the first side of the driving device 300, the output pin PP2 may be provided on the opposite side of the first side.

According to the disclosure, a power signal transmitted from one side of the driving device 300 through the power line P may be easily transmitted to the other side of the driving device 300.

For example, as shown in FIG. 12, the input pin PP1 may be provided on a right side of the driving device 300, and the output pin PP2 may be provided on a left side of the driving device 300. However, the positions of the input pin PP1 and output pin PP2 are not limited thereto.

According to various embodiments, the input pin PP1 may be provided on the left side of the driving device 300, and the output pin PP2 may be provided on the right side of the driving device 300.

According to various embodiments, the plurality of pins TP1, TP2, PP1, PP2, DP1, DP2, CP may further include at least one control pin CP connected to the control line C.

In an embodiment, the at least one control pin CP may not be disposed between the pair of pins TP1 and TP2 connected to the timing line T and the pair of pins PP1 and PP2 connected to the power line P.

For example, the input pin TP1 connected to the timing line T and the input pin PP1 connected to the power line P may be provided between a plurality of control pins CP.

The output pin TP2 connected to the timing line T and the output pin PP2 connected to the power line P may be provided between the plurality of control pins CP.

According to the disclosure, the control line C may not intersect the timing line T and the power line P without a separate electronic element (e.g., jumper connector).

The positions of the plurality of pins DP1, DP2, TP1, TP2, PP1, PP2, CP provided on the driving device 300 may be changed depending on the arrangement design of the plurality of signal lines D, T, P, C.

In an embodiment, the driving device 300 may include at least one internal wiring ID, IT, IP. The at least one internal wiring ID, IT, IP may electrically connect at least one input pin DP1, TP1, PP1 and at least one output pin DP2, TP2, PP2.

The at least one internal wiring ID, IT, IP may be provided within an area defined by the driving device 300.

That is, the at least one internal wiring ID, IT, IP may not be formed on the substrate 112, but may be formed within the driving device 300 according to an internal design of the driving device 300.

The at least one internal wiring ID, IT, IP may include the internal wiring ID that electrically connects the input pin DP1 and the output pin DP2.

The input pin DP1 and the output pin DP2 may be shorted to each other through the internal wiring ID.

A data signal input through the input pin DP1 may be output through the output pin DP2.

A line connected to the input pin DP1 and a line connected to the output pin DP2 may both be defined as the data line D.

The data line D may transmit the data signal. For example, the data line D may be connected to the dimming driver 170.

The at least one internal wiring ID, IT, IP may include the internal wiring IT that electrically connects the input pin TP1 and the output pin TP2.

The input pin TP1 and output pin TP2 may be shorted to each other through the internal wiring IT.

A timing signal input through the input pin TP1 may be output through the output pin TP2.

A line connected to the input pin TP1 and a line connected to the output pin TP2 may both be defined as the timing line T.

The timing line T may transmit the timing signal. For example, the timing line T may be connected to the dimming driver 170.

The at least one internal wiring ID, IT, IP may include the internal wiring IP that electrically connects the input pin PP1 and the output pin PP2.

The input pin PP1 and the output pin PP2 may be shorted to each other through the internal wiring IP.

A power signal input through the input pin PP1 may be output through the output pin PP2.

A line connected to the input pin PP1 and a line connected to the output pin PP2 may both be defined as the power line P.

The power line P may transmit the power signal.

In related art, a plurality of signal lines formed on a substrate intersect each other, requiring a printed circuit board with more layers or requiring more jumper connectors.

According to the disclosure, even without forming a line bypassing the driving device 300 on the printed circuit board, a signal received from one side of the driving device 300 may be transmitted to the other side of the driving device 300, thereby reducing complexity due to a plurality of signal lines.

Figure 13:
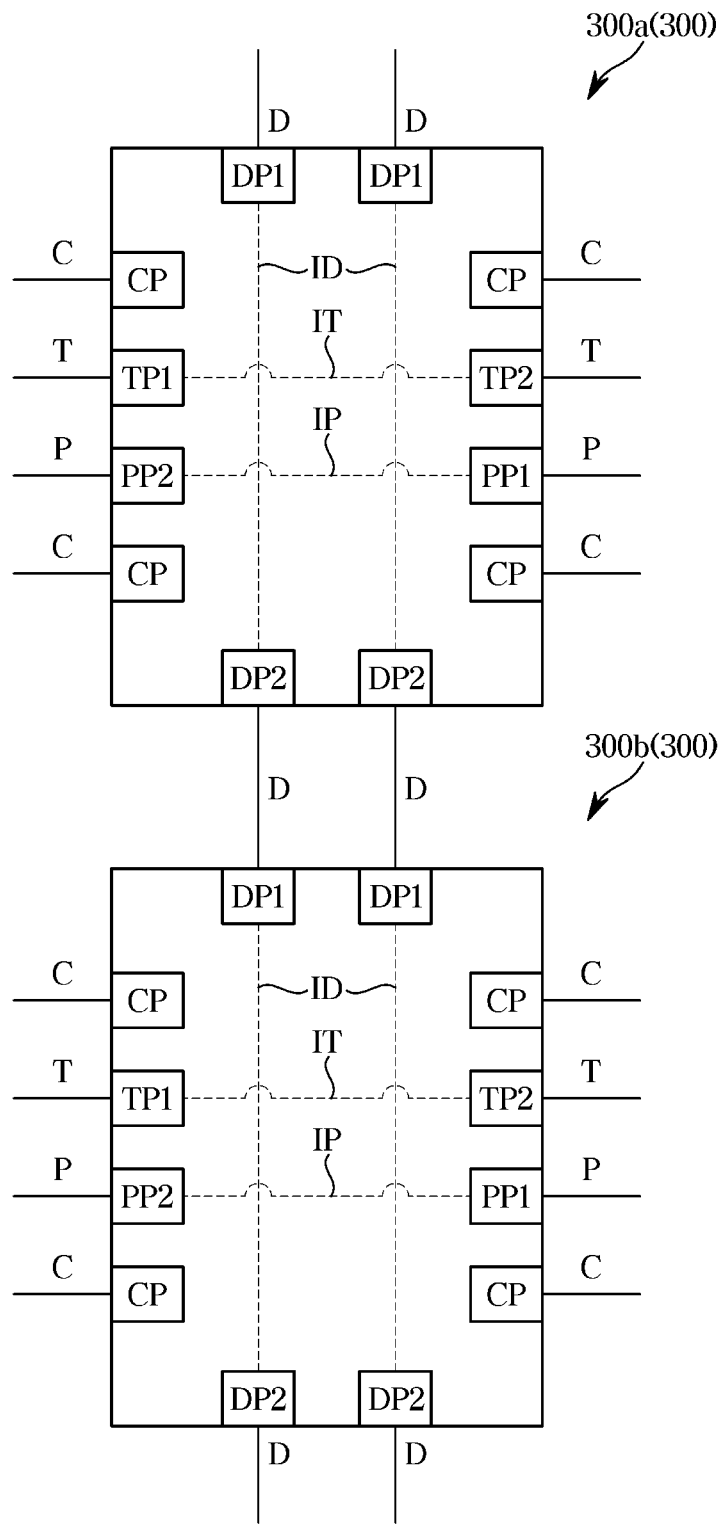
FIG. 13 schematically illustrates an example of a connection relationship among driving devices according to an embodiment.
Figure 14:
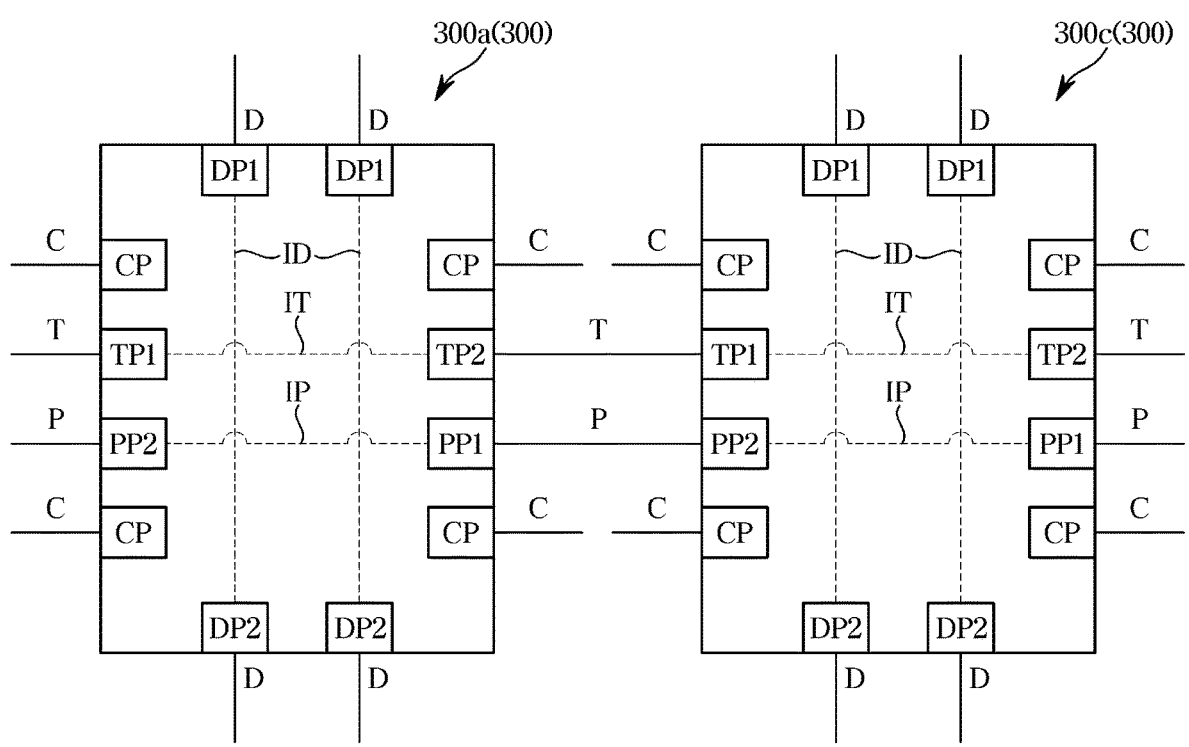
FIG. 14 schematically illustrates an example of a connection relationship among driving devices according to an embodiment.
Figure 15:
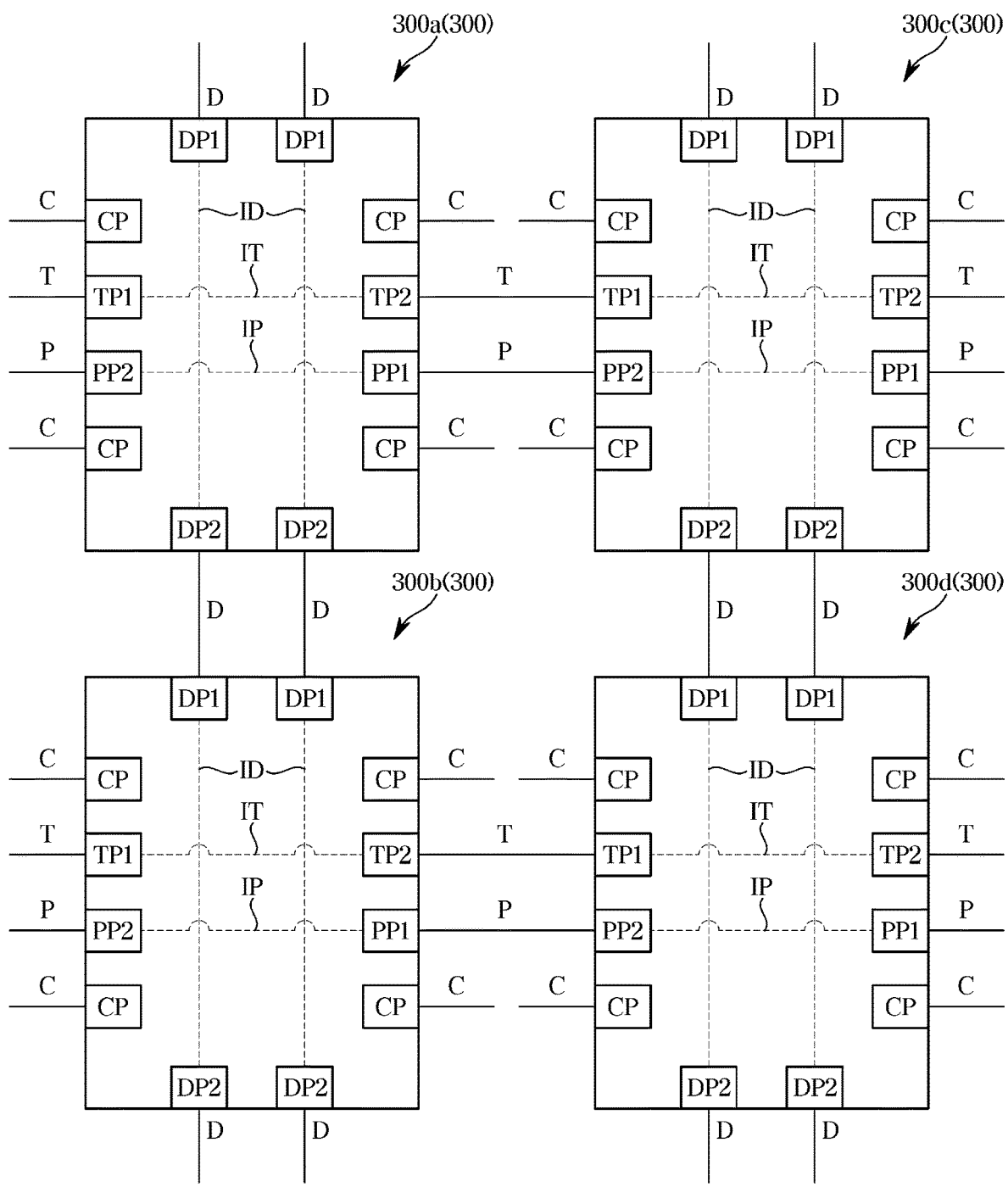
FIG. 15 schematically illustrates an example of a connection relationship among driving devices according to an embodiment.

FIG. 13, FIG. 14 and FIG. 15 schematically illustrate an example of a connection relationship among driving devices according to an embodiment.

According to various embodiments, the plurality of driving devices 300 may be provided on the substrate 112, and the driving devices 300 for controlling the dimming blocks 200 arranged in the same column may be arranged in the same column.

According to various embodiments, the plurality of driving devices 300 may be provided on the substrate 112, and the driving devices 300 for controlling the dimming blocks 200 arranged in different columns may be arranged in columns different from each other.

FIG. 13 illustrates a connection relationship between a first driving device and a second driving device arranged in the same column and adjacent to each other.

Referring to FIG. 13, as described in FIG. 12, a first driving device 300a and a second driving device 300b may each include a plurality of pins DP1, DP2, TP1, TP2, PP1, PP2, CP.

The second driving device 300b may be provided at a lower end of the first driving device 300a.

According to various embodiments, the output pin DP2 of the first driving device 300a may be electrically connected to the input pin DP1 of the second driving device 300b.

For example, the output pin DP2 of the first driving device 300a may be electrically connected to the input pin DP1 of the second driving device 300b through a data line D formed on the substrate 112.

According to various embodiments, the input pin DP1 of the first driving device 300a may be electrically connected to the output pin DP2 of the driving device 300 disposed above the first driving device 300a, and may also be electrically connected to the dimming driver.

According to various embodiments, the output pin DP2 of the second driving device 300b may be electrically connected to the input pin DP1 of the driving device 300 disposed below the second driving device 300b, and in a case where the second driving device 300b is the driving device 300 provided at the lowermost side, the output pin DP2 of the second driving device 300b may be connected to ground.

According to various embodiments, in a case where the second driving device 300b is the driving device 300 provided at the lowermost side, the second driving device 300b may not include the output pin DP2.

According to the disclosure, data signals may be transmitted between the driving devices 300 arranged in the same column using a minimum number of data lines D.

FIG. 14 illustrates a connection relationship between the first driving device 300a and a third driving device 300c which are arranged in different columns and adjacent to each other.

According to various embodiments, the first driving device 300a and the third driving device 300c may be arranged in the same row or in different rows.

Referring to FIG. 14, as described in FIG. 12, each of the first driving device 300a and the third driving device 300c may include a plurality of pins DP1, DP2, TP1, TP2, PP1, PP2, CP.

The third driving device 300c may be provided on a side of the first driving device 300a.

According to various embodiments, the output pin TP2 of the first driving device 300a may be electrically connected to the input pin TP1 of the third driving device 300c.

For example, the output pin TP2 of the first driving device 300a may be electrically connected to the input pin TP1 of the third driving device 300c through a timing line T formed on the substrate 112.

Differently from that shown in FIG. 14, in a case where the timing line T is formed from a right side of the substrate 112, the input pins TP1 of the first and third driving devices 300a and 300c may be provided on the right sides of the first and third driving devices 300a and 300c, and the output pins TP2 of the first and third driving devices 300a and 300c may be provided on the left sides of the first and third driving devices 300a and 300c. Accordingly, the output pin TP2 of the third driving device 300c may be electrically connected to the input pin TP1 of the first driving device 300a.

According to various embodiments, the input pin TP1 of the first driving device 300a may be electrically connected to the output pin TP2 of the driving device 300 disposed on a left side of the first driving device 300a, and may also be electrically connected to the dimming driver.

According to various embodiments, the output pin TP2 of the third driving device 300c may be electrically connected to the input pin TP1 of the driving device 300 disposed on a right side of the third driving device 300c, and in a case where the third driving device 300c is the driving device 300 located at the rightmost side, the output pin TP2 of the third driving device 300c may be connected to ground.

According to various embodiments, in a case where the third driving device 300c is the driving device 300 located at the rightmost side, the third driving device 300c may not include the output pin TP2.

According to the disclosure, timing signals may be transmitted between the driving devices 300 arranged in different columns using a minimum number of timing lines T.

According to various embodiments, the output pin PP2 of the third driving device 300c may be electrically connected to the input pin PP1 of the first driving device 300a.

For example, the output pin PP2 of the third driving device 300c may be electrically connected to the input pin PP1 of the first driving device 300a through a power line P formed on the substrate 112.

Differently from that shown in FIG. 14, in a case where the power line P starts from the left, the input pins PP1 of the first and third driving devices 300a and 300c may be provided on the left sides of the first and third driving devices 300a and 300c, and the output pins PP2 of the first and third driving devices 300a and 300c may be provided on the right sides of the first and third driving devices 300a and 300c. Accordingly, the output pin PP2 of the first driving device 300a may be electrically connected to the input pin PP1 of the third driving device 300c.

According to various embodiments, the input pin PP1 of the third driving device 300c may be electrically connected to the output pin PP2 of the driving device 300 disposed on the right side of the third driving device 300c, and may also be electrically connected to the dimming driver.

According to various embodiments, the output pin PP2 of the first driving device 300a may be electrically connected to the input pin PP1 of the driving device 300 disposed on the left side of the first driving device 300a, and in a case where the first driving device 300a is the driving device 300 located at the leftmost side, the output pin PP2 of the first driving device 300a may be connected to ground.

According to various embodiments, in a case where the first driving device 300a is the driving device 300 located at the leftmost side, the first driving device 300a may not include the output pin PP2.

According to the disclosure, power signals may be transmitted between the driving devices 300 arranged in different columns using a minimum number of power lines P.

FIG. 15 illustrates a connection relationship among the first driving device 300a, the second driving device 300b, the third driving device 300c and a fourth driving device 300d, wherein the first driving device 300a and the second driving device 300b are arranged in the same column and adjacent to each other, and the third driving device 300c and the fourth driving device 300d are arranged in a different column from the first driving device 300a and the second driving device 300b and adjacent to each other.

Referring to FIG. 15, the first driving device 300a and the second driving device 300b may be arranged in the same column. The third driving device 300c and the fourth driving device 300d may be arranged in the same column.

The first and second driving devices 300a and 300b and the third and fourth driving devices 300c and 300d may be arranged in adjacent columns.

The first driving device 300a and the third driving device 300c may be the driving devices 300 that are closest to each other among the driving devices 300 arranged in different columns.

The second driving device 300b and the fourth driving device 300d may be the driving devices 300 that are closest to each other among the driving devices 300 arranged in different columns.

Referring to FIG. 15, as described in FIG. 12, the first driving device 300a, the second driving device 300b, the third driving device 300c, and the fourth driving device 300d may each include a plurality of pins DP1, DP2, TP1, TP2, PP1, PP2, CP.

The output pin DP2 of the first driving device 300a may be electrically connected to the input pin DP1 of the second driving device 300b through a data line D.

The output pin DP2 of the third driving device 300c may be electrically connected to the input pin DP1 of the fourth driving device 300d through a data line D.

According to various embodiments, the data line D connected to the first driving device 300a and the second driving device 300b may transmit different data signals from the data line D connected to the third driving device 300c and the fourth driving device 300d.

For example, the data line D connected to the first driving device 300a and the second driving device 300b may transmit a data signal corresponding to the dimming blocks 200 arranged in a column adjacent to the first driving device 300a and the second driving device 300b. The data line D connected to the third driving device 300c and the fourth driving device 300d may transmit a data signal corresponding to the dimming blocks 200 arranged in a column adjacent to the third driving device 300c and the fourth driving device 300d.

In an embodiment, the dimming blocks 200 corresponding to two columns may be disposed between the first driving device 300a and the third driving device 300c.

The output pin TP2 of the first driving device 300a may be electrically connected to the input pin TP1 of the third driving device 300c through a timing line T.

The output pin TP2 of the second driving device 300b may be electrically connected to the input pin TP1 of the fourth driving device 300d through the timing line T.

The output pin PP2 of the third driving device 300c may be electrically connected to the input pin PP1 of the first driving device 300a through the power line P.

The output pin PP2 of the fourth driving device 300d may be electrically connected to the input pin PP1 of the second driving device 300b through the power line P.

In the disclosure, it is assumed that the timing line T is formed from a left side of the substrate 112 and the power line P is formed from a right side of the substrate 112, but the embodiment is not limited thereto.

According to various embodiments, the timing line T may be formed from the right side of the substrate 112 and the power line P may be formed from the left side of the substrate 112.

According to various embodiments, the output pin TP2 of the third driving device 300c may be electrically connected to the input pin TP1 of the first driving device 300a through the timing line T.

According to various embodiments, the output pin TP2 of the fourth driving device 300d may be electrically connected to the input pin TP1 of the second driving device 300b through the timing line T.

According to various embodiments, the output pin PP2 of the first driving device 300a may be electrically connected to the input pin PP1 of the third driving device 300c through the power line P.

According to various embodiments, the output pin PP2 of the second driving device 300b may be electrically connected to the input pin PP1 of the fourth driving device 300d through the power line P.

According to the disclosure, the data line D may be provided between the driving devices 300 adjacent in the column direction, and the timing line T and/or power line P may be provided between the driving devices 300 adjacent in the row direction.

Thus, according to the disclosure, the data line D, timing line T, and power line P may be formed in the substrate 112 without intersecting each other.

In an embodiment, a plurality of control pins CP provided in the driving device 300 surround pins TP1 and TP2, which are connected to the timing line T, and pins PP1 and PP2 which are connected to the power line P. Accordingly, a plurality of control lines C may be provided outside of the timing line T and the power line P.

According to the disclosure, the control line C may be connected to the plurality of dimming blocks independently without intersecting the timing line T and the power line P.

In addition, according to the disclosure, the control line C may be connected to the plurality of dimming blocks 200 located above and below the driving device 300 without intersecting the timing line T and the power line P.

According to the disclosure, because the timing line T, the power line P, the data line D, and the control line C do not intersect each other, the number of layers of the substrate 112 and/or electrical elements (e.g., jumper connectors) may be minimized.

According to various embodiments, the substrate 112 may be a printed circuit board consisting of at least one layer including a first layer. For example, the substrate 112 may be a single-sided PCB consisting of a first layer, or may be a multi-layer PCB consisting of a first layer and at least one second layer.

In an embodiment, the timing line T, the power line P, the data line D, and the control line C may be formed on the first layer.

Figure 16:
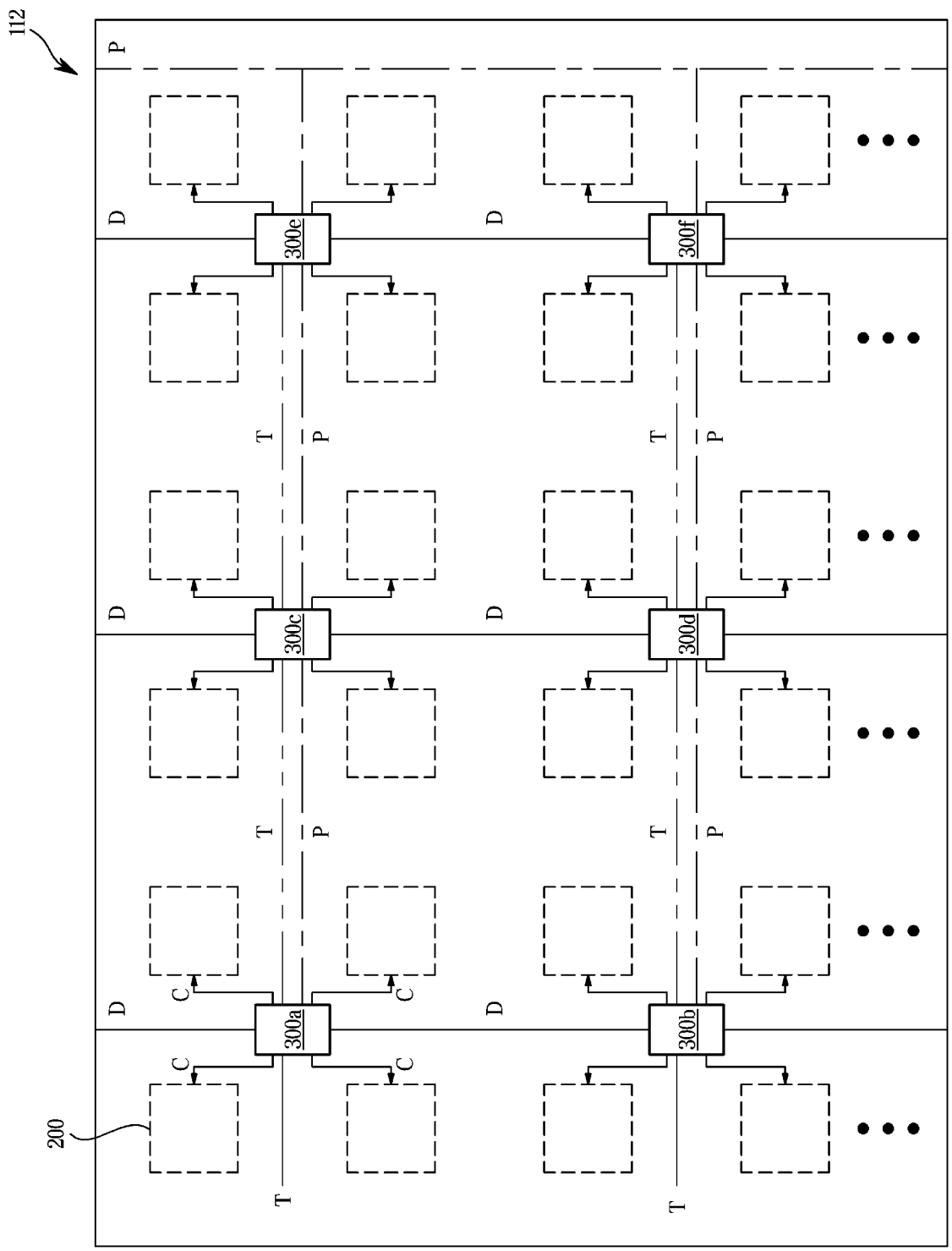
FIG. 16 schematically illustrates an example of a connection relationship among driving devices on a substrate according to an embodiment.

FIG. 16 schematically illustrates an example of a connection relationship among driving devices on a substrate according to an embodiment.

Referring to FIG. 16, the substrate according to an embodiment may include a plurality of dimming blocks 200 arranged in a matrix form and a plurality of driving devices (300; 300a, 300b, 300c, 300d, 300e, 300f) disposed among the plurality of dimming blocks 200.

According to various embodiments, the plurality of driving devices 300 may be arranged between two rows and between two columns of the matrix formed by the plurality of dimming blocks 200, but the arrangement of the plurality of driving devices 300 is not limited thereto.

Although it is illustrated in FIG. 16 that a timing line T is formed from a left side of the substrate and a power line P is formed from a right side of the substrate, the embodiment is not limited thereto.

The substrate 112 may include the first driving device 300a, the second driving device 300b disposed below the first driving device 300a, the third driving device 300c disposed on a side of the first driving device 300a, the fourth driving device 300d disposed below the third driving device 300c, the fifth driving device 300e disposed on a side of the third driving device 300c, and the sixth driving device 300f disposed below the fifth driving device 300e.

The first driving device 300a may be connected to a data line D corresponding to a plurality of dimming blocks 200 disposed in a first column (leftmost column) and a second column adjacent to the first column.

Although a single data line D is illustrated in the drawing, a plurality of data lines D may exist.

In an embodiment, the timing line T may be formed from the left side of the substrate 112.

The timing line T connected to left sides of the first and second driving devices 300a and 300b may extend to right sides of the first and second driving devices 300a and 300b and may be connected to left sides of the third and fourth driving devices 300c and 300d.

The timing line T connected to the left sides of the third and fourth driving devices 300c and 300d may extend to right sides of the third and fourth driving devices 300c and 300d and may be connected to left sides of the fifth and sixth driving devices 300e and 300f.

According to the disclosure, the timing line T may extend in the row direction among the first and second driving devices 300a and 300b, the third and fourth driving devices 300c and 300d, and the fifth and sixth driving devices 300e and 300f, thereby not intersecting other signal lines on the substrate 112.

In an embodiment, the power line P may be formed from the right side of the substrate 112.

The power line P connected to right sides of the fifth and sixth driving devices 300e and 300f may extend to the left sides of the fifth and sixth driving devices 300e and 300f and may be connected to the right sides of the third and fourth driving devices 300c and 300d.

The power line P connected to the right sides of the third and fourth driving devices 300c and 300d may extend to the left sides of the third and fourth driving devices 300c and 300d and may be connected to the right sides of the first and second driving devices 300a and 300b.

According to the disclosure, the power line P may extend in the row direction among the first and second driving devices 300a and 300b, the third and fourth driving devices 300c and 300d, and the fifth and sixth driving devices 300e and 300f, thereby not intersecting other signal lines on the substrate 112.

The data line D connected to an upper side of the first driving device 300a may extend to a lower side of the first driving device 300a and may be connected to an upper side of the second driving device 300b.

The data line D connected to an upper side of the third driving device 300c may extend to a lower side of the third driving device 300c and may be connected to an upper side of the fourth driving device 300d.

The data line D connected to an upper side of the fifth driving device 300 may extend to a lower side of the fifth driving device 300 and may be connected to an upper side of the sixth driving device 300.

According to the disclosure, the data line D may extend in the column direction between the first, third and fifth driving devices 300a, 300c and 300e and the second, fourth and sixth driving devices 300b, 300d, and 300f, thereby not intersecting other signal lines on the substrate 112.

According to various embodiments, a control line C may be formed above the timing line T or below the power line P.

For example, the control line C extending from the first driving device 300a may be formed above the timing line T or below the power line P.

As another example, the control line C extending from the second driving device 300b may be formed above the timing line T or below the power line P.

According to various embodiments, the control line C may not be formed between the timing line T and the power line P.

According to the disclosure, the control line C may be connected to each of the dimming blocks 200 without intersecting the timing line T and/or the power line P.

According to the disclosure, the control line C, the timing line T, the power line P, and the data line D may be formed on a single layer of the substrate 112.

Figure 17:
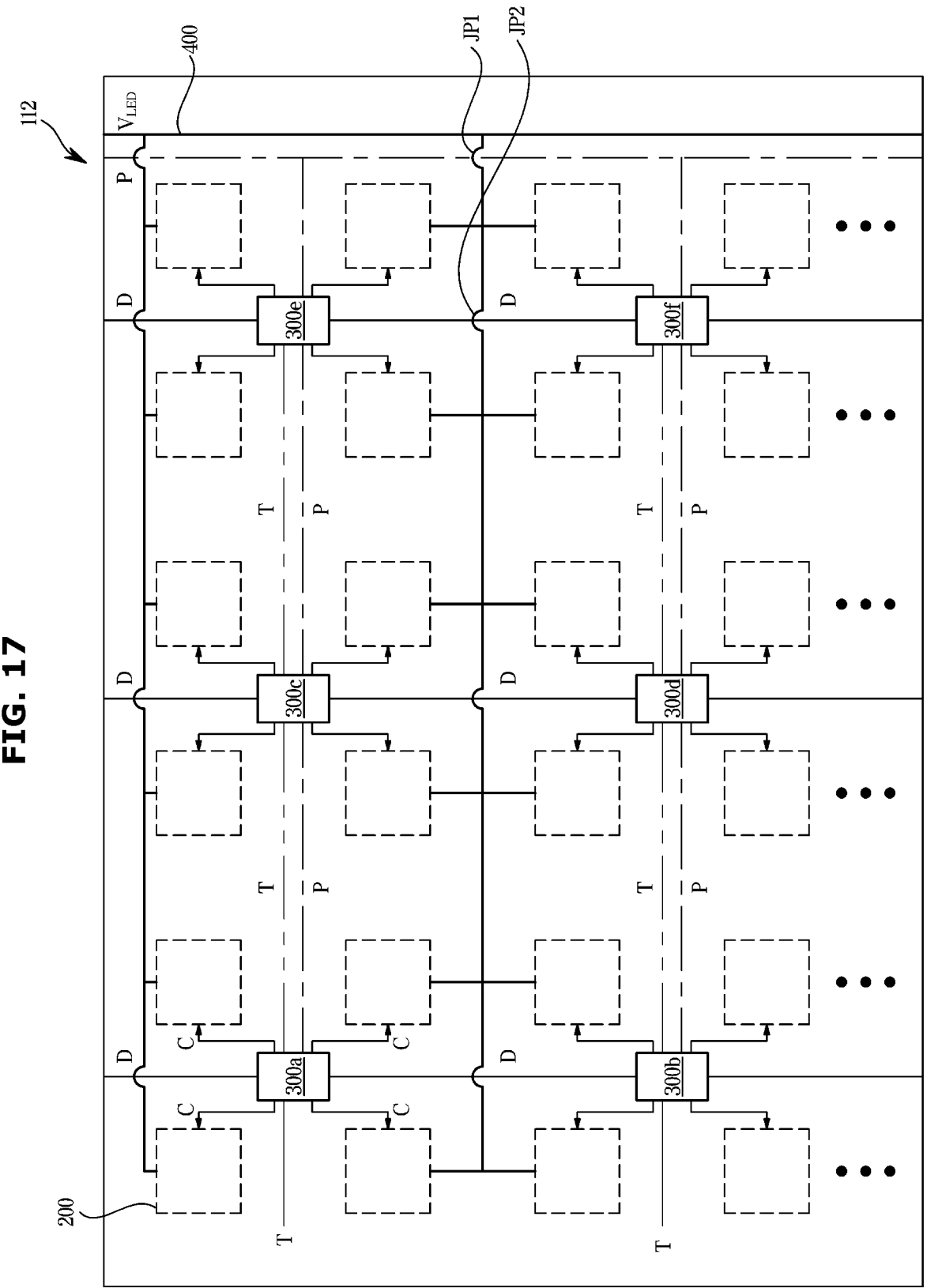
FIG. 17 schematically illustrates an example of a connection relationship among driving devices and an example of a structure of a driving line on a substrate according to an embodiment.

FIG. 17 schematically illustrates an example of a connection relationship among driving devices and an example of a structure of a driving line on a substrate according to an embodiment.

Referring to FIG. 17, the substrate 112 may include the driving line 400 for supplying a driving voltage $V_{LED}$ to each of the plurality of dimming blocks 200.

The driving line 400 may be connected to each of the plurality of dimming blocks 200.

According to various embodiments, in a case where the substrate 112 is a multi-layer PCB, the driving line 400 may be formed on a different layer from a data line D and a power line P.

According to various embodiments, in a case where the substrate 112 is a multi-layer PCB or even in a case where the substrate 112 is a single-sided PCB including a single layer, the driving line 400 may be formed on the same layer as the data line D, the timing line T and the power line P.

Because the driving line 400 is formed in the row direction on the substrate 112 and the data line D is formed in the column direction on the substrate 112, the driving line 400 and the data line D may intersect each other.

According to various embodiments, in a case where the power line P includes a column direction pattern, the driving line 400 and the data line D may intersect each other.

Accordingly, an electronic element such as a jumper connector is required in order for the driving line 400 to be formed on the same layer as the data line D and/or the power line P.

In an embodiment, the driving line 400 may extend in the row direction to supply power to the plurality of dimming blocks. In an embodiment, the driving line 400 may extend in the column direction to supply power to the plurality of dimming blocks.

In an embodiment, to prevent the driving line 400 from intersecting the timing line T and the power line P, the driving line 400 may be formed in a different row from a row in which the timing line T and the power line P are formed.

According to various embodiments, the substrate 112 may include at least one jumper connector JP1 to guide the driving line 400 and the power line P, which intersect each other on a single layer, to be electrically spaced from each other.

The jumper connector JP1 may guide an electrical path to allow the driving line 400 to be spaced apart from the power line P.

For example, the jumper connector JP1 may be disposed on one side of the conduction layer 252 to guide the driving line 400 to be electrically spaced from the power line P.

According to various embodiments, the substrate 112 may include at least one jumper connector JP2 to guide the driving line 400 and the data line D, which intersect each other on a single layer, to be electrically spaced from each other.

The jumper connector JP2 may guide an electrical path to allow the driving line 400 to be spaced apart from the data line D.

For example, the jumper connector JP2 may be disposed on one side of the conduction layer 252 to guide the driving line 400 to be electrically spaced from the data line D.

According to the disclosure, the timing line T, data line D, power line P, and control line C are formed on a single layer so as not to intersect each other, thereby minimizing the use of jumper connectors.

According to the disclosure, complexity of a conductive pattern of the substrate 112 may be reduced by using internal wirings ID, IT, IP provided in the driving device 300.

The disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that can be interpreted by a computer. For example, the computer-readable recording medium may be a Read Only Memory (ROM), a Random Access Memory (RAM), a magnetic tape, a magnetic disk, a flash memory, an optical data storage device, etc.

Furthermore, the computer-readable recording medium may be provided in the form of a non-transitory storage medium. The term 'non-transitory storage medium' may mean a tangible device without including a signal (e.g., electromagnetic waves) and may not distinguish between storing data in the storage medium semi-permanently and temporarily. For example, the non-transitory storage medium may include a buffer that temporarily stores data.

The method according to the various embodiments of the disclosure may be provided in a computer program product. The computer program product may be a commercial product that may be traded between a seller and a buyer. The computer program product may be distributed in the form of a storage medium (e.g., a compact disc read only memory (CD-ROM)), through an application store (e.g., Play Store™), directly between two user devices (e.g., smartphones), or online (e.g., downloaded or uploaded). In the case of online distribution, at least part of the computer program product (e.g., a downloadable app) may be at least temporarily stored or arbitrarily created in a storage medium that may be readable to a device such as a server of the manufacturer, a server of the application store, or a relay server.

While the disclosure has been particularly shown and described with reference to embodiments thereof, it will be understood that various changes in form and details may be made therein without departing from the spirit and scope of the following claims.

What is claimed is:

1. A display apparatus, comprising:
   a liquid crystal panel; and
   a light source apparatus comprising:
   a substrate comprising a first side directed to the liquid crystal panel;
   at least one dimming block disposed on the first side of the substrate and each of the at least one dimming block comprising at least one light source;
   a first driving device disposed on the first side of the substrate and configured to drive the at least one dimming block;
   a second driving device disposed on the first side of the substrate and configured to drive the at least one dimming block; and
   at least one signal line disposed on the substrate, wherein the at least one signal line comprises at least one of:
   a timing line configured to transmit a timing signal to at least one of the first driving device or the second driving device;
   a data line configured to transmit a data signal to at least one of the first driving device or the second driving device; or
   a power line configured to transmit a power signal to at least one of the first driving device or the second driving device,
   wherein the first driving device comprises:
   a first input pin directly electrically connected to the at least one signal line; and
   a first output pin directly electrically connected to the first input pin, wherein the second driving device comprises:
a second input pin directly electrically connected to the first output pin; and
a second output pin directly electrically connected to the second input pin,
wherein the first driving device comprises an internal wiring configured to directly electrically connect the first input pin and the first output pin within an area defined by the first driving device, and
wherein at least one of the timing signal, the data signal or the power signal is transmitted from the first driving device to the second driving device through the first input pin, the internal wiring comprised in the first driving device, the first output pin, the at least one signal line extended from the first output pin to the second input pin and the second input pin.

2. The display apparatus of claim 1, wherein the second driving device is disposed at a first end of the first driving device, and
the data line is directly electrically connected to the first input pin.

3. The display apparatus of claim 2, wherein the first input pin is disposed at a second end of the first driving device opposite the first end of the first driving device, the first output pin is disposed at the first end of the first driving device, the second input pin is disposed at a second end of the second driving device, and the second output pin is disposed at a first end of the second driving device opposite the second end of the second driving device.

4. The display apparatus of claim 1, wherein the second driving device is disposed on a side of the first driving device, and
the timing line is directly electrically connected to the first input pin.

5. The display apparatus of claim 4, wherein the first input pin is disposed on a first side of the first driving device, the first output pin is disposed on a second side of the first driving device opposite the first side of the first driving device, the second input pin is disposed on a first side of the second driving device, and the second output pin is disposed on a second side of the second driving device opposite the first side of the second driving device.

6. The display apparatus of claim 1, wherein the second driving device is disposed on a side of the first driving device, and
the power line is directly electrically connected to the first input pin.

7. The display apparatus of claim 6, wherein the first input pin is disposed on a first side of the first driving device, the first output pin is disposed on a second side of the first driving device opposite the first side of the first driving device, the second input pin is disposed on a first side of the second driving device, and the second output pin is disposed on a second side of the second driving device opposite the first side of the second driving device.

8. The display apparatus of claim 1, wherein the first driving device and the second driving device further comprise:
a plurality of control pins configured to be electrically connected to the at least one dimming block, and
wherein the first input pin is directly electrically connected to the timing line, the second input pin is directly electrically connected to the power line, and the first input pin and the second input pin are disposed between the plurality of control pins.

9. The display apparatus of claim 1, further comprising:
a panel driver configured to drive the liquid crystal panel; and
a dimming driver configured to drive the light source apparatus, wherein the dimming driver is configured to be electrically connected to the timing line and the data line.

10. The display apparatus of claim 1, wherein the substrate comprises a printed circuit board consisting of at least one layer comprising a first layer, and
the timing line, the data line and the power line are disposed on the first layer without intersecting each other.

11. The display apparatus of claim 10, further comprising:
a driving line disposed on the first layer and configured to supply a driving voltage to each of the at least one dimming block; and
at least one jumper connector configured to guide an electrical path to allow the driving line to be spaced apart from the power line and the data line,
wherein the driving line does not intersect the timing line.

12. The display apparatus of claim 10, further comprising:
a control line disposed on the first layer, and configured to electrically connect the at least one dimming block and the first driving device and the second driving device,
wherein the control line does not intersect the timing line, the data line and the power line.

13. The display apparatus of claim 1, further comprising:
a control line disposed on the substrate, and configured to electrically connect the at least one dimming block and the first driving device and the second driving device;
a driving line disposed on the substrate, and configured to supply power to each of the at least one dimming block; and
at least one jumper connector configured to guide an electrical path to allow the driving line to be spaced apart from the data line,
wherein the substrate comprises a printed circuit board comprising at least one layer comprising a first layer,
the timing line, the data line, the power line, the control line and the driving line are disposed on the first layer,
the timing line, the data line, the power line, and the control line do not intersect each other, and
the driving line and the data line intersect each other.

14. A light source apparatus, comprising:
a substrate;
at least one dimming block disposed on a first side of the substrate and each of the at least one dimming block comprising at least one light source;
a first driving device disposed on the first side of the substrate and configured to drive the at least one dimming block;
a second driving device disposed on the first side of the substrate and configured to drive the at least one dimming block; and
at least one signal line disposed on the substrate, wherein the at least one signal line comprises at least one of:
a timing line configured to transmit a timing signal to at least one of the first driving device or the second driving device;
a data line configured to transmit a data signal to at least one of the first driving device or the second driving device; or
a power line configured to transmit a power signal to at least one of the first driving device or the second driving device, wherein the first driving device comprises:
- a first input pin directly electrically connected to the at least one signal line; and
- a first output pin directly electrically connected to the first input pin, wherein the second driving device comprises:
- a second input pin directly electrically connected to the first output pin; and
- a second output pin directly electrically connected to the second input pin, wherein the first driving device comprises an internal wiring configured to directly electrically connect the first input pin and the first output pin within an area defined by the first driving device, and wherein at least one of the timing signal, the data signal or the power signal is transmitted from the first driving device to the second driving device through the first input pin, the internal wiring comprised in the first driving device, the first output pin, the at least one signal line extended from the first output pin to the second input pin and the second input pin.

15. The light source apparatus of claim 14, wherein the second driving device is disposed at a first end of the first driving device, and the data line is directly electrically connected to the first input pin.

16. The light source apparatus of claim 15, wherein the first input pin is disposed at a second end of the first driving device opposite the first end of the first driving device, the first output pin is disposed at the first end of the first driving device, the second input pin is disposed at a second end of the second driving device, and the second output pin is disposed at a first end of the second driving device opposite the second end of the second driving device.

17. The light source apparatus of claim 14, wherein the second driving device is disposed on a side of the first driving device, and
the timing line is directly electrically connected to the first input pin.

18. The light source apparatus of claim 17, wherein the first input pin is disposed on a first side of the first driving device, the first output pin is disposed on a second side of the first driving device opposite the first side of the first driving device, the second input pin is disposed on a first side of the second driving device, and the second output pin is disposed on a second side of the second driving device opposite the first side of the second driving device.

* * * * *